US012389905B2

(12) United States Patent
Castillo Lopez et al.

(10) Patent No.: US 12,389,905 B2
(45) Date of Patent: Aug. 19, 2025

(54) SYNERGISTIC MIXTURE OF PLANT DEFENSE INDUCTORS

(71) Applicants: LIDA PLANT RESEARCH S.L., Valencia (ES); OAT AGRIO CO., LTD., Tokyo (JP)

(72) Inventors: Jose Ignacio Castillo Lopez, Valencia (ES); Noelia Sanchez Delgado, Valencia (ES); Sachi Kimura, Tokyo (JP)

(73) Assignees: LIDA PLANT RESEARCH S.L., Valencia (ES); OAT AGRIO CO., LTD., Tokyo (JP)

( * ) Notice: Subject to any disclaimer, the term of this patent is extended or adjusted under 35 U.S.C. 154(b) by 984 days.

(21) Appl. No.: 17/047,296

(22) PCT Filed: Apr. 17, 2019

(86) PCT No.: PCT/EP2019/060026
§ 371 (c)(1),
(2) Date: Oct. 13, 2020

(87) PCT Pub. No.: WO2019/202050
PCT Pub. Date: Oct. 24, 2019

(65) Prior Publication Data
US 2022/0022454 A1    Jan. 27, 2022

(30) Foreign Application Priority Data
Apr. 19, 2018  (EP) ..................................... 18382265

(51) Int. Cl.
| A01N 63/10 | (2020.01) |
| A01N 37/40 | (2006.01) |
| A01N 43/16 | (2006.01) |
| A01N 63/50 | (2020.01) |
| A01N 65/00 | (2009.01) |

(52) U.S. Cl.
CPC .............. *A01N 37/40* (2013.01); *A01N 43/16* (2013.01); *A01N 63/10* (2020.01); *A01N 63/50* (2020.01); *A01N 65/00* (2013.01)

(58) Field of Classification Search
CPC ........ A01N 37/40; A01N 63/50; A01N 63/10; A01N 43/16; A01N 65/00
See application file for complete search history.

(56) References Cited

U.S. PATENT DOCUMENTS

| 2,921,409 | A | * | 1/1960 | Seifter | .................... | A23L 27/30 |
| | | | | | | 71/1 |
| 2003/0139295 | A1 | * | 7/2003 | Doostdar | ............... | A01N 37/40 |
| | | | | | | 504/121 |
| 2010/0087369 | A1 | | 4/2010 | Cutsem et al. | | |
| 2010/0256369 | A1 | * | 10/2010 | Suga | .................... | C07D 471/04 |
| | | | | | | 544/282 |
| 2010/0281585 | A1 | | 11/2010 | Ryu et al. | | |
| 2010/0325755 | A1 | | 12/2010 | Cochran | | |
| 2017/0238546 | A1 | * | 8/2017 | Teeranitayatarn | ....... | C05D 3/00 |

FOREIGN PATENT DOCUMENTS

| CN | 105168019 A | * 12/2015 | ............. A61K 8/736 |
| JP | 2015077116 A | 4/2015 | |
| WO | WO 2003/051120 | 6/2003 | |

OTHER PUBLICATIONS

English machine translation of CN 105168019 A made on Jan. 2, 2024. (Year: 2024).*
Choi, et al.; "Harpins, multifunctional proteins secreted by gram-negative plant-pathogenic bacteria"; MPMI; vol. 26, No. 10, pp. 1115-1122 (2013).
Chuang, et al.; "Harpin Protein, an Elicitor of Disease Resistance, Acts as a Growth Promoter in Phalaenopsis Orchids"; Journal of Plant Growth Regulation; vol. 33, pp. 788-797 (2014).
Mishina, et al.; "Pathogen-associated molecular pattern recognition rather than development of tissue necrosis contributes to bacterial induction of systemic acquired resistance in *Arabidopsis*"; The Plant Journal; vol. 50, pp. 500-513 (2007).
Newman, et al.; "MAMP (microbe-associated molecular pattern) triggered immunity in plants"; Front Plant Sci.; vol. 4, No. 139, 14 pages (May 2013).
Tsuda, et al.; "Comparing signaling mechanisms engaged in pattern-triggered and effector-triggered immunity"; Current Opinion in Plant Biology; vol. 13, No. 4, pp. 459-465 (Aug. 1, 2010).
Vasconcelos; "Chitosan and chitooligosaccharide utilization in phytoremediation and biofortification programs: current knowledge and future perspectives"; Front Plant Sci .; vol. 5, No. 616, 4 pages (Nov. 2014).

* cited by examiner

*Primary Examiner* — Michael B. Pallay
(74) *Attorney, Agent, or Firm* — Snell & Wilmer LLP

(57) ABSTRACT

The present invention discloses a mixture of compounds one being a pattern-triggered immunity inductor and the other being a systemic resistance inductor that improves plant defense mechanisms, in particular by providing a synergistic effect on the plant defense mechanisms. Further aspects of the invention are the use of said for activating plant resistance against pathogens, and a kit for providing an agricultural composition for use in seeds, crops and plants.

8 Claims, 2 Drawing Sheets

12,389,905 B2

SYNERGISTIC MIXTURE OF PLANT DEFENSE INDUCTORS

TECHNICAL FIELD

The present disclosure relates to a composition suitable for plant defense against pathogens. The disclosure also relates to the method to obtain the composition and uses of said composition.

BACKGROUND ART

Over time, plant species have been continuously exposed to a wide range of pathogens and pests, as well as adverse environmental conditions. This has led to an evolutionary process of adaptation of the plants, characterized by the development of robust and complex resistance mechanisms. One of the characteristics of this adaptation is the autonomy of plant cells to perceive and recognize pathogens, and to activate resistance mechanisms. These abilities have driven to the development of an immune system, capable of distinguishing its own signals (endogenous, from the own plant) from the others (exogenous, derived from pathogens).

The natural defense process of plants, called plant immunity, comprises a complex network of pathways and signaling cascades, mediated by many regulators and secondary messengers, which are triggered as the pathogen is able to overcome each defense barrier.

The first tier of the plant immune system corresponds to pathogen perception via the recognition of molecular signatures of pathogens (pathogen-associated molecular patterns, PAMPs) by plant cell membrane receptors. This recognition induces the pattern-triggered immunity (PTI), a defense response characterized by cell wall strengthening and activation of defence genes expression.

The plant is also able to detect damage-associated molecular patterns (DAMPs), which are plant degradation products resulting from the action of invading pathogens, or endogenous peptides, constitutively present or newly synthesized, which are released by the plants following pathogen attacks (Boller T. and Felix G. (2009) Annu Rev Plant Biol. 60:379-406.). Recognition of DAMPs also triggers immune responses similar to the PTI response (Yamaguchi Y. and Huffaker A. (2011) Curr Opin Plant Biol 14(4):351-7).

Pathogen perception can also occur via the recognition of effectors, which are molecules synthesized by the pathogens and delivered in the extracellular matrix or into the plant cell to enhance pathogen fitness by, for example, counteracting the induction of PTI. Plants that are able to recognize these effectors directly or indirectly by disease resistance proteins R, can implement an immune response called effector-triggered immunity or ETI (Chisholm S. T., Coaker G., Day B., Staskawicz B. J. (2006) Cell, 124(4), 803-814). This response is the result of plant-pathogen co-evolution.

Defense responses activated by PTI and ETI lead to the activation of local as well as systemic defence responses, called Systemic Resistance (SR), which are modulated by phytohormones, especially salicylic acid, jasmonic acid and ethylene (WE Durrant and X Dong, 2004; 42:185-209; and R M Bostock, Annu Rev Phytopathol 2005; 43:545-80).

Systemic Resistance (SR) is a long-lasting and broad-spectrum defense response, which depends on phytohormones-mediated signalling pathways and whose objective is the synthesis and accumulation of antimicrobial compounds and defence proteins in uninfected tissues and organs. (Ward E. R., Uknes S. J., Williams S. C., Dincher S. S., Wiederhold D. L., Alexander D. C., Ahl-Goy P., Metraux J. P., Ryals J. A. (1991) Plant Cell October; 3(10):1085-1094 and Fu Z. Q. and Dong X. (2013) Annu Rev Plant Biol 64:839-63). PTI and ETI, unlike Systemic Resistance, appear to be independent on signal transduction pathways mediated by the phytohormones salicylic acid, jasmonic acid and ethylene.

If these defense mechanisms are activated in the plants before pathogen infection, disease can be reduced. Thereby, the exogenous and preventive application of plant defense inductors is the way to achieve this objective.

Pattern-triggered immunity inductors are substances which, when applied to plants, are recognized by plant cell membrane receptors, triggering a defence response. Pattern-triggered immunity inductors comprise PAMPs, compounds that come from pathogens, and DAMPs, compounds coming from the plant itself. Bacterial lipopolysaccharides, endotoxins found on cell membranes of Gram-negative bacteria, fungal chitooligosaccharides and plant cell wall oligogalacturonides are prototypical class of PTI inductors.

A Systemic Resistance inductor is a compound directly involved in plant defense activation through phytohormones-mediated signalling pathways, which drive to systemic resistance and synthesis of defense proteins in the whole plant. (Bektas Y. and Eulgem T. (2015) Frontiers in plant science, 5, 804 and Faize L. and Faize, M. (2018) Agronomy, 8(1), 5).

There is thus an intense research in this area in order to improve plant resistance and increase its survival. Thus, there is a need to improve and/or promote plant defence mechanisms.

SUMMARY OF THE INVENTION

The inventors have found that the use of a mixture of compounds one being a pattern-triggered immunity inductor and the other being a systemic resistance inductor improves plant defense mechanisms, more importantly, by providing a surprising synergistic effect on the plant defense mechanisms.

Thus, one aspect of the present invention provides a composition comprising a pattern-triggered immunity inductor and a systemic resistance inductor.

The plant resistance enhancing composition of the invention can be used as a method to improve plant defense against pathogens, more specifically, the composition improves plant defense activation against biotic stress caused by pathogens.

For example, the invention provides a composition comprising a pattern-triggered immunity inductor and a systemic resistance inductor, wherein the pattern-triggered immunity inductor is selected from the group of pathogen-associated molecular pattern inductors and damage associated molecular pattern inductors.

Further aspects of the invention are the use of the composition as defined above for activating plant resistance against pathogens, and an agricultural composition comprising the following components: (a) a pattern-triggered immunity inductor; and (b) a systemic resistance inductor. The invention also provides a kit comprising a pattern-triggered immunity inductor and a systemic resistance inductor.

DETAILED DESCRIPTION OF THE INVENTION

1—Pattern-Triggered Immunity (PTI) Inductor

Figure 1:
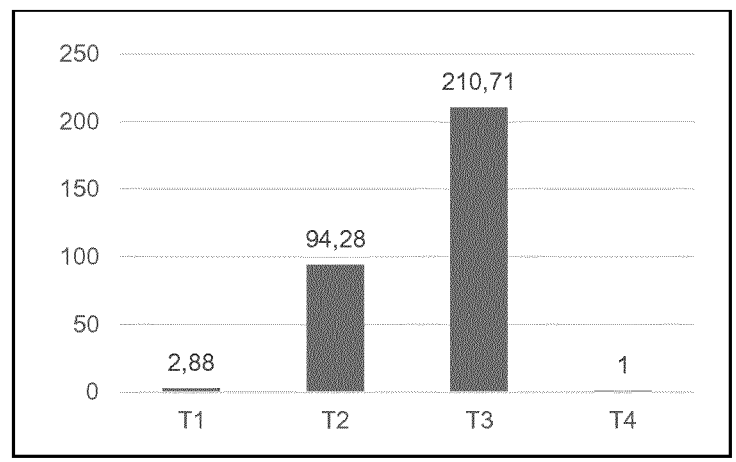
FIG. 1 is a bar diagram that shows the expression of gene PR1 in the plant *Arabidopsis thaliana* in four different conditions: T1, T2, T3, T4. In T1, the plant has been treated with 100 ppm of chitooligosaccharides dissolved in water; in T2, the treatment of the plant is performed with 300 ppm of sodium saccharin in water; in T3, according to the invention, the plant has been treated with a water solution consisting of 100 ppm of chitooligosacharides and 300 ppm of sodium saccharide; in T4, the plant has been treated with water, as a control. In the y-axis the values represent how many times more the study gene is expressed in the samples treated with inductor with respect to the control samples (n-fold versus control).

The composition of the present invention is a plant resistance enhancing composition. It comprises a pattern-triggered immunity inductor. This compound can preferably be selected from the group of pathogen-associated molecular pattern inductors and damage associated molecular pattern inductors.

The pattern-triggered immunity inductor used in the present invention is preferably selected from the group of polysaccharides and oligosaccharides, optionally extracted from biomass, flagellin, LAS117 strain of *Saccharomyces cerevisiae* (known as the registered product cerevisane), harpin protein and combinations thereof.

Polysaccharides are polymeric carbohydrate molecules composed of long chains of monosaccharide units bound together by glycosidic linkages, and on hydrolysis give the constituent monosaccharides or oligosaccharides.

Oligosaccharides are polymeric carbohydrate molecules containing a small number of monosaccharide units.

The polysaccharides and oligosaccharides of the present invention can be natural, extracted from biomass. Biomass most often refers to plants or plant-based materials that are not used for food or feed, and are specifically called lignocellulosic biomass. (See the following references in which polysaccharides and oligosaccharides according to the invention are related to plant defense: Côté F, Ham K-S, Hahn M G, Bergmann C W (1998) Subcellular Biochemistry, Plant-Microbe Interactions. New York, USA: Plenum Press, 385-432; Vera J., Castro J., Gonzalez A., Moenne A. (2011) Marine drugs, 9(12), 2514-2525 and Trouvelot S., Héoir M. C., Poinssot B., Gauthier A., Paris F., Guillier C., Combier M., Tdra L., Daire X., Adrian M. (2014) Frontiers in plant science, 5, 592).

The polysaccharides and oligosaccharides, optionally extracted from biomass, in the present invention are preferably selected from the group of laminarin, chitosan, chitooligosaccharides, ulvans, fucoidans, carrageenans, oligopectins, oligogalacturonides and combinations thereof.

Laminarin is a storage glucan (a polysaccharide of glucose) found in brown algae. These energy reserve polysaccharides are present in reserve vacuoles inside the macroalgal cell and may constitute up to 35% of the dried weight of the macroalgal biomass. Chemically laminarin is described as 1,3-linked β-D-glucose residues with different degrees of branching at β-(1,6) that influences the water solubility of the molecules. This chemical structure may vary in its degree of branching and polymerization and in the ratio of (1,3)- and (1,6)-glycosidic bonds. (See the following references in which laminarin is related to plant defense: Klarzynski O., Plesse B., Joubert J. M., Yvin J. C., Kopp M., Kloareg B., and Fritig, B (2000) Plant Physiol. 124:1027-1037 and Aziz A., Poinssot B., Daire X., Adrian M., Bézier A., Lambert B., Joubert J. M, Pugin A. (2003) Molecular Plant-Microbe Interactions, 16(12), 1118-1128).

Chitosan is a linear polysaccharide composed of randomly distributed β-(1→4)-linked D-glucosamine (deacetylated unit) and N-acetyl-D-glucosamine (acetylated unit). It is made by treating the chitin shells of shrimp and other crustaceans with an alkaline substance, like sodium hydroxide.

Chitooligosaccharides are oligosaccharides derived from chitin or chitosan by enzymatic or chemical treatment. Chitin is a modified polysaccharide that contains nitrogen; it is synthesized from units of N-acetyl-D-glucosamine (precisely, 2-(acetylamino)-2-deoxy-D-glucose). These units form covalent β-(1→4)-linkages (similar to the linkages between glucose units forming cellulose). Therefore, chitin may be described as cellulose with one hydroxyl group on each monomer replaced with an acetyl amine group. This allows for increased hydrogen bonding between adjacent polymers, giving the chitin-polymer matrix increased strength. (See the following references in which chitosan, chitooligosaccharides and oligosaccharides according to the invention are related to plant defense: Kaku H., Nishizawa Y., Ishii-Minami N., et al. (2006) Proc Natl Acad Sci USA, 103, 11086-91; Yin H., Zhao X., Du Y. (2010) Carbohydr Polym, 82, 1-8 and Das S. N., Madhuprakash J., Sarma P. V. S. R. N., Purushotham P., Suma K., Manjeet K., Rambabu S., El Gueddari N. E., Moerschbacher B., Podile, A. R. (2015) Critical reviews in biotechnology, 35(1), 29-43).

Ulvans represent a class of sulphated heteropolysaccharide extracted from the cell wall of green seaweeds belonging to U/va sp. whose composition has been extensively debated and showed to vary according to several factors. The sugar composition of Ulvans is extremely variable but rhamnose, xylose, glucuronic and iduronic acid and the presence of sulphate groups have been identified as the main constituents of the polymer. These monomers are arranged in an essentially linear fashion even though a slight degree of branching has been found. The chemical heterogeneity of Ulvans is partially striken by a "structural motif" found within the heteropolymer chain essentially given by the presence of repeating dimeric sequences constituted by aldobiuronic acid disaccharides designated as type A (glucurorhamnose 3-sulphate, A3s) and type B (iduronorhamnose 3-sulphate, B3s). (See the following references in which ulvans according to the invention are related to plant defense: Cluzet S., Torregrosa C., Jacquet C., Lafitte C., Fournier J., Mercier L., Salamagne S., Briand X., Esquerré-Tugayé M. T., Dumas, B. (2004) Plant, Cell & Environment, 27(7), 917-928 and Jaulneau V., Lafitte C., Jacquet C., Fournier S., Salamagne S., Briand X., Esquerré-Tugayé M. T, Dumas, B. (2010) BioMed Research International, 2010, doi:10.1155/2010/525291).

Fucoidans are sulfated polysaccharides (MW: average 20,000) found mainly in various species of brown algae and brown seaweed such as mozuku, kombu, bladderwrack, wakame, and hijiki (variant forms of fucoidans have also been found in animal species, including the sea cucumber). Fucoidans are used as an ingredient in some dietary supplement products. They are fucose-containing sulfated polysaccharides (FCSPs) that have a backbone built of $(1\rightarrow3)$-linked $\alpha$-I-fucopyranosyl or of alternating $(1\rightarrow3)$- and $(1\rightarrow4)$-linked $\alpha$-I-fucopyranosyl residues, and also include sulfated galactofucans with backbones built of $(1\rightarrow6)$-$\beta$-d-galacto- and/or $(1\rightarrow2)$-$\beta$-dmannopyranosyl units with fucose or fuco-oligosaccharide branching, and/or glucuronic acid, xylose or glucose substitutions. (See references in which fucoidans according to the invention are related to plant defense: Klarzynski O., Descamps V., Plesse B., Yvin J. C., Kloareg B., Fritig B. (2003) Molecular Plant-Microbe Interactions, 16(2), 115-122 and Chandia N. P., Matsuhiro B. (2008) International Journal of Biological Macromolecules, 42(3), 235-240).

Carrageenans or carrageenins are a family of linear sulfated polysaccharides that are extracted from red edible seaweeds. They are widely used in the food industry, for their gelling, thickening, and stabilizing properties. Their main application is in dairy and meat products, due to their strong binding to food proteins. There are three main varieties of carrageenan, which differ in their degree of sulfation. Kappa-carrageenan has one sulfate group per disaccharide, iota-carrageenan has two, and lambda-carrageenan has three. All carrageenans are high-molecular-weight polysaccharides made up of repeating galactose units and 3,6 anhydrogalactose (3,6-AG), both sulfated and nonsulfated. The units are joined by alternating $\alpha$-1,3 and $\beta$-1,4 glycosidic linkages. (See references in which carrageenans or carrageenins according to the invention are related to plant defense: Mercier L., Lafitte C., Borderies G., Briand X., Esquerré-Tugayé M. T., Fournier J. (2001) New Phytologist, 149(1), 43-51 and Shukla P. S., Borza T., Critchley A. T., Prithiviraj B. (2016) Frontiers in Marine Science, 3, 81).

Oligopectins are short polymers derived from pectins, which is a heteropolysaccharide contained in the primary cell walls of terrestrial plants. Pectins are rich in galacturonic acid. Several distinct polysaccharides have been identified and characterised within the pectic group. (See references in which oligopectins according to the invention are related to plant defense: Nothnagel E. A, McNeil M., Albersheim P., Dell A. (1983) Plant Physiol, 71(4):916-926).

Oligogalacturonides are oligomers of alpha-1,4-linked galacturonosyl residues released from plant cell walls upon partial degradation of homogalacturonan. (See references in which oligogalacturonides according to the invention are related to plant defense: Denoux C., Galletti R., Mammarella N., Gopalan S., Werck D., De Lorenzo G., Ferrari S., Ausubel F. M., Dewdney J. (2008) Mol. Plant, 1, 423-445 and Ferrari S., Savatin D. V., Sicilia F., Gramegna G., Cervone F., Lorenzo G. D. (2013) Front Plant Sci, 4, 49).

Flagellin is a globular protein that arranges itself in a hollow cylinder to form the filament in a bacterial flagellum. It has a mass of about 30,000 to 60,000 daltons. Flagellin is the main component of bacterial flagellum, and is present in large amounts on nearly all flagellated bacteria. (See references in which flagellin is related to plant defense: Felix G., Duran J. D., Volko S., Boller T. (1999) Plant J, 18:265-276; Gómez-Gómez L., Boller T. (2002) Trends in plant science, 7(6), 251-256 and Zipfel C., Robatzek S., Navarro L., Oakeley E. J., Jones J. D., Felix G., Boller, T. (2004) Nature, 428(6984), 764).

Cerevisane is a registered product in which the LAS117 strain of *Saccharomyces cerevisiae* is the active ingredient. (See references in which cerevisane is related to plant defense: EFSA Journal 2014, 12(6):3583).

Harpins are heat-stable Gly-rich proteins that are encoded by hrp genes present in several phytopathogenic bacteria. Harpin is one of the first bacterial elicitors characterized as inducing hypersensitive response in several non-host species. In addition to eliciting several active defense responses in plants leading to the hypersensitive response, which include rapid ion fluxes, membrane depolarization, and generation of reactive oxygen species (ROS), harpin has also been shown to contribute to disease resistance in plants by reducing bacterial growth. (See references in which harpin is related to plant defense: Wei Z. M, Laby R. H, Zumoff C. H, et al. (1992) Science, 257, 85-8 and He S. Y, Huang H C, Collmer A. (1993) Cell, 73, 1255-66).

2—Systemic Resistance (SR) Inductor

The present invention features also a systemic resistance inductor. The SR inductor is preferably selected from compounds comprising a benzoisothiazole moiety, compounds comprising an isothiazole moiety, compounds comprising a thiadiazole moiety, saturated dicarboxylic acids, compounds comprising a nicotinic acid moiety, compounds comprising a pyrazole moiety, non-proteinogenic aminoacids, compounds comprising a salicylate moiety, compounds comprising a benzoate moiety, vitamins, compounds comprising a jasmonate moiety and salts thereof.

In the context of the present invention salts of the above mentioned SR inductor compounds may be any type of salts if they are agriculturally acceptable. Non-limiting examples of the salts include inorganic acid salts, such as hydrochloride salt, a sulfate salt, a nitrate salt, and the like; organic acid salts, such as an acetate salt, a methanesulfonic acid salt, and the like; alkali metal salts, such as sodium salt, potassium salt, and the like; alkaline earth metal salts, such as a calcium salt, and the like; quaternary ammonium salts, such as tetramethylammonium, tetraethylammonium, and the like.

According to the present invention, those compounds comprising a benzoisothiazole moiety may have the following formula (I):

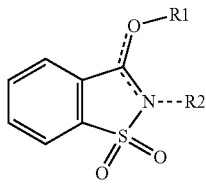
(I)

wherein
- if the bond between the nitrogen atom and the carbon atom in the benzoisothiazole ring is a double bond, then R1 is selected from the group of —C1-C6-alkyl, —C2-C6-alkenyl, —C2-C6-alkynyl, -heteroaryl, and —(C1-C6-alkylene)-heteroaryl, and R2 is not present; or
- if the bond between the carbon atom adjacent to the nitrogen in the benzoisothiazole ring and the oxygen is double, then R2 is selected from the group of hydrogen, —C1-C6-alkyl and negative charge together with a metallic cation, and R1 is not present.

Preferably, the benzothiazoles of the invention comprise a benzoisothiazole moiety according to formula (I), wherein
- if the bond between the nitrogen atom and the carbon atom in the benzoisothiazole ring is double, then R1 is selected from the group of —C1-C6-alkyl, —C2-C6-alkenyl, and —(C1-C3-alkylene)-heteroaryl, and R2 is not present; or
- if the bond between the carbon atom adjacent to the nitrogen in the benzoisothiazole ring and the oxygen is double, then R2 is selected from the group of hydrogen and negative charge together with an alkali cation, and R1 is not present.

"Alkyl" refers to a straight or branched hydrocarbon chain radical consisting of carbon and hydrogen atoms, containing no unsaturation, having 1 to 6 carbon atoms, which is attached to the rest of the molecule by a single bond.

"Alkenyl" refers to a straight or branched hydrocarbon chain radical consisting of carbon and hydrogen atoms, containing at least one unsaturation, having 2 to 6, preferably two to three carbon atoms, and which is attached to the rest of the molecule by a single bond.

"Alkynyl" refers to a straight or branched hydrocarbon chain radical consisting of carbon and hydrogen atoms, containing at least one carbon-carbon triple bond, conjugated of not, having two to six, preferably two to three carbon atoms, and which is attached to the rest of the molecule by a single bond.

"Heteroaryl" refers to a heterocyclic group wherein at least one of the rings is an aromatic ring.

Preferably, the benzoisothiazoles of the invention are selected from the group of probenazole, saccharin, sodium saccharin and dichlobentiazox. (See references in which the benzoisothiazoles according to the invention are related to vegetable defense: Yoshioka K., Nakashita H., Klessig D. F., Yamaguchi I. (2001) The Plant Journal, 25(2), 149-157; Boyle C. and Walters D. (2005) New Phytology, 167, 607-612; Boyle C. and Walters D. R. (2006) Plant Pathology, 55, 82-91).

Their structures are the following:
1) Probenazole

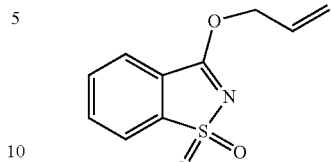

2) Saccharin

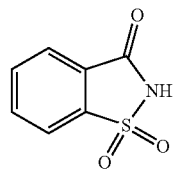

3) Sodium Saccharin

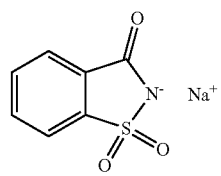 [SMILES: O=C1[N-]S(=O)(=O)c2ccccc21 ; [Na+]]

4) Dichlobentiazox

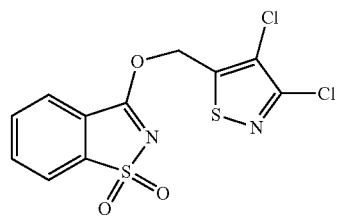 [SMILES: O=S1(=O)N=C(OCc2snc(Cl)c2Cl)c2ccccc21]

Compounds acting as systemic resistance inductors comprising isothiazole moiety are derived from isothiazole. The preferred isothiazole according to the invention is isotianil. (See references in which isotianil is related to vegetable defense: Ogava M., Kadowaki A., Yamada T., Kadooka O. (2011) R&D Report, No. I. Takarazuka: Health & Crop Sciences Research Laboratory, Sumitomo Chemical Co., Ltd, 1-16).

Further, compounds acting as systemic resistance inductors having a thiadiazole moiety are derived from thiadiazole. Preferably, the thiadiazoles of choice in the present invention are selected from the group of tiadinil, its metabolite 4-methyl-1,2,3-thiadiazole-5-carboxylic acid and acibenzolar-S-methyl. (See references in which those thiadazole moieties according to the invention are related to vegetable defense: Yasuda M., Nakashita H., Yoshida S. (2004) J. Pestic. Sci, 29, 46-49; Görlach J., Volrath S., Knauf-Beiter G., Hengy G., Beckhove U., Kogel K.-H., et al. (1996) Plant Cell, 8, 629-643 and Lawton K. A., Friedrich L., Hunt M., Weymann K., Delaney T., Kessmann H., et al. (1996) Plant J, 10, 71-82).

Saturated dicarboxylic acids acting as systemic resistance inductors refer to those compounds that comprise two carboxylic acid moieties. Preferably, in the present invention the dicarboxylic acid of choice is azelaic acid. (See references in which azelaic acid is related to vegetable defense: Jung H. W., Tschaplinski T. J., Wang L., Glazebrook J., Greenberg J. T. (2009) Science 324, 89-91).

Systemic resistance inductors may comprise compounds comprising a nicotinic acid moiety. Preferably, the nicotinic acid compound according to the invention is selected from the group of 2,6-dichloro-isonicotinic acid and N-cyanomethyl-2-chloro isonicotinamide. (See references in which compounds comprising a nicotinic acid moiety according to the invention are related to vegetable defense: Metraux J. P., Ahlgoy P., Staub T., Speich J., Steinemann A., Ryals J., et al. (1991) Advances in Molecular Genetics of Plant-Microbe Interactions, Vol. 1, eds H. Hennecke and D. Verma (Dordrecht: Kluwer Academic Publishers); Uknes S., Mauch-Mani B., Moyer M., Potter S., Williams S., Dincher S., et al. (1992) Plant Cell 4, 645-656 and Yoshida H., Konishi K., Koike K., Nakagawa T., Sekido S., Yamaguchi I. (1990) J. Pestic. Sci., 15, 413-417).

Other systemic resistance inductors according to the invention comprise a pyrazole moiety. Preferably, the pyrazole derivative according to the invention is a 3-chloro-1-methyl-1H-pyrazole-5-carboxylic acid. (See references in which said pyrazole derivative is related to vegetable defense: Nishioka M., Nakashita H., Suzuki H., Akiyama S., Yoshida S., Yamaguchi I. (2003) J. Pestic. Sci., 28, 416-421 and Nishioka M., Nakashita H., Yasuda M., Yoshida S., Yamaguchi I. (2005) J. Pestic. Sci., 30, 47-49).

Non-proteinogenic aminoacids acting as systemic resistance inductors are those aminoacids that do not belong to the twenty aminoacids encoded by messenger RNA. The preferred non-proteinogenic aminoacid in the present invention is beta-aminobutyric acid (BABA). (See references in which BABA is related to vegetable defense: Zimmerli L., Métraux J. P., Mauch-Mani B. (2001) Plant Physiol., 126, 517-523; Cohen Y., Rubin A. E., Kilfin G. (2010) Eur. J. Plant Pathol., 130, 13-27 and Sasek V., Novakova M., Dobrev R. I., Valentova O., Burketova L. (2012) Eur. J. Plant Pathol., 133, 279-289).

Other inductors comprise a salicylate moiety. Preferably, compounds comprising a salicylate moiety are selected from the group of salicylic acid, 3,5-dichlorosalicylic acid, 4-chlorosalicylic acid, 5-chlorosalicylic acid, acetylsalicylic acid and methyl salicylate. (See references in which compounds comprising a salicylate moiety according to the invention are related to vegetable defense: Loake G., Grant M. (2007) Current opinion in plant biology, 10(5), 466-472; Faize L. and Faize, M. (2018) Agronomy, 8(1), 5; Conrath U., Chen Z., Ricigliano J. R., Klessig D. F. (1995) Proc. Natl. Acad. Sci. USA, 92, 7143-7147 and Park S. W., Kaimoyo E., Kumar D., Mosher S., Klessig D. F. (2007) Science, 318 (5847), 113-116).

Further, systemic resistance inductors comprise compounds comprising a benzoate moiety. Preferably, compounds comprising a benzoate moiety are selected from the group of p-aminobenzoic acid, 3-chlorobenzoic acid, 2-amino-3,5-dichlorobenzoic acid (3,5-dichloroanthranilic acid) and 3,5-dichlorobenzoic acid. (See references in which compounds comprising a benzoate moiety according to the invention are related to vegetable defense: Song G. C., Choi H. K., Ryu C. M. (2013) Ann. Bot. 111, 925-934 and Knoth C., Salus M. S., Girke T., Eulgem T. (2009) Plant Physiol., 150, 333-347).

Vitamins can be components of the systemic resistance inductors. Preferably, vitamins are selected from the group of vitamin B1, menadione sodium bisulphite, compounds comprising a vitamin K3 moiety and vitamin B2. (See references in which vitamins according to the invention are related to vegetable defense: Boubakri H., Gargouri M., Mliki A., Brini F., Chong J., Jbara, M. (2016) Planta, 244(3), 529-543; Ahn I. P., Kim S., Lee Y. H., Suh S. C. (2007) Plant Physiol. 143, 838-848; Borges A. A., Dobon A., Expósito-Rodriguez M., Jiménez-Arias D., Borges-Pérez A., Casañas-Sánchez V., Pérez J. A., Luis J. C., Tornero P. (2009) Plant biotechnology journal, 7(8), 744-762; Borges A. A., Jiménez-Arias D., Exposito-Rodriguez M., Sandalio L. M., Pérez J. A. (2014) Frontiers in plant science, 5, 642 and Zhang S. J., Yang X., Sun M. W., Sun F., Deng S., Dong H. S. (2009) J. Integr. Plant Biol. 51, 167-174).

Further inductors comprise compounds comprising a jasmonate moiety. In the present invention, the preferred compounds comprising a jasmonate moiety are selected from the group of jasmonic acid, methyl jasmonate, propyl dihydrojasmonate and methyl dihydrojasmonate. (See references in which compounds comprising a jasmonate moiety according to the invention are related to vegetable defense: Cohen Y., Gisi U., Niderman T. (1993) Phytopathology, 83(10), 1054-1062; Santino A., Taurino M., De Domenico S., Bonsegna S., Poltronieri P., Pastor V., Flors V. (2013) Plant cell reports, 32(7), 1085-1098 and Barros Oliveira M., Junior M. L., Grossi-de-Sá M. F., Petrofeza S. (2015) Journal of plant physiology, 182, 13-22).

3—Compositions

The weight ratio between the PTI inductor and the SRI in the composition of the invention may vary typically between 200:1 to 1:6,000, or from 100:1 to 1:5,000, or from 50:1 to 1:1,000; or from 25:1 to 1:500 or from 10:1 to 1:250 or from 5:1 to 1:100, for example from 2:1 to 1:50 or from 1:1 to 1:25, such as 1:5, or 1:10, or 1:20.

According to preferred compositions of the invention the pattern-triggered immunity inductor (PTI inductor) is selected from the group of polysaccharides and oligosaccharides, optionally extracted from biomass, preferably selected from the group of laminarin, chitooligosaccharides, carrageenans and mixtures of chitooligosaccharides and oligogalacturonides, wherein the PTI inductor is present in an amount comprised between 10 and 4000 ppm, or for example between 50 and 3500 ppm, or for example 100 to 3000 ppm. In preferred embodiments laminarin is used, and preferably in an amount between 10 and 200 ppm, more preferably between 20 and 150 ppm, for example 30, 75, 100 or 135 ppm. In preferred embodiments chitooligosaccharides are used and preferably in an amount between 50 and 500 ppm, more preferably between 100 and 400 ppm, for example 200 ppm, 250 ppm or 300 ppm. In preferred embodiments carrageenans are used, and preferably in an amount between 50 and 4000 ppm, more preferably between 75 and 3500 ppm, for example 100, 500, 1000, 2000, or 3000 ppm. In other preferred embodiments a mixture of chitooligosaccharides and oligogalacturonides is used, preferably in an amount between 15 and 50 ppm, more preferably between 20 and 40 ppm, for example 30, 35, 37 or 38 ppm.

According to preferred compositions of the invention the pattern-triggered immunity inductor (PTI inductor) is flagellin, wherein the PTI inductor flagellin is present in an amount comprised between 0.5 and 5 ppm, or for example between 0.7 and 4.5 ppm, or for example 1 to 4 ppm. In preferred embodiments flagellin is used preferably in an amount between 1.5 and 3.5 ppm, more preferably between 2 and 2.5 ppm, for example 2.1 or 2.3 ppm.

According to preferred compositions of the invention the pattern-triggered immunity inductor (PTI inductor) is harpin protein, wherein the PTI inductor harpin protein is present in an amount comprised between 0.2 and 5 ppm, or for example between 0.4 and 4 ppm, or for example 0.7 to 3 ppm. In preferred embodiments harpin protein is used preferably in an amount between 1 and 2.5 ppm, more preferably between 1.2 and 2 ppm, for example 1.3, or 1.5 or 1.7 ppm.

The preferred compositions also comprise a systemic resistance inductor (SRI) selected from the group consisting of compounds comprising a benzoisothiazole moiety such as probenazole, saccharin, sodium saccharin and dichlobentiazox, compounds comprising an isothiazole moiety such as isotianil and isotianil metabolite 3,4-dichloro-1,2-thiazole-5-carboxylic acid, compounds comprising a thiadiazole moiety such as tiadinil, tiadinil metabolite 4-methyl-1,2,3-thiadiazole-5-carboxylic acid and acibenzolar-S-methyl, saturated dicarboxylic acids such as azelaic acid, compounds comprising a nicotinic acid moiety such as 2,6-dichloro-isonicotinic acid and N-cyanomethyl-2-chloro isonicotinamide, non-proteinogenic aminoacids such as beta-aminobutyric acid, compounds comprising a salicylate moiety, such as salicylic acid, 3,5-dichlorosalicylic acid, 4-chlorosalicylic acid, 5-chlorosalicylic acid, acetylsalicylic acid, and methyl salicylate, compounds comprising a benzoate moiety such as p-aminobenzoic acid, 3-chlorobenzoic acid, 2-amino-3,5-dichlorobenzoic acid (3,5-dichloroanthranilic acid) and 3,5-dicholorobenzoic acid, vitamins such as vitamin B1, menadione sodium bisulphite, compounds comprising a vitamin K3 moiety and vitamin B2 and compounds comprising a jasmonate moiety such as jasmonic acid, methyl jasmonate, propyl dihydrojasmonate, and methyl dihydrojasmonate, wherein the SRI inductor is present in an amount comprised between 2 and 10,000 ppm, or between 20 and 8,500 or between 25 and 8,000, for example 100, 300, 600, 1,000, 3000, 5,000 or 8,000 ppm.

In preferred embodiments compounds comprising a benzoisothiazole moiety, preferably probenazole or sodium saccharin or dichlobentiazox are used, and preferably in an amount of between 5 to 350 ppm or between 10 to 300 ppm, like 20, 40, 50, 75, 100, 150, 175 or 200.

In preferred embodiments probenazole or dichlobentiazox is used in an amount of between 50 and 200 ppm, like 75 ppm or 100 ppm or 150 ppm.

In preferred embodiments sodium saccharin is used in an amount of between 5 and 350 ppm, like 10 or 20, or 40, or 100 ppm, 200 ppm or 300 ppm In preferred embodiments compounds comprising an isothiazole moiety, preferably isotianil are used and preferably in an amount of between 20 to 200 ppm, or for example from 30 to 150 ppm, for example 40, 50, 75, 100, 125 ppm.

In preferred embodiments compounds comprising a thiadiazole moiety preferably tiadinil or acibenzolar-S-methyl are used and preferably in an amount of between 2 to 150 ppm, or of between 3 to 120 ppm, or between 4 to 100 ppm.

Tiadinil is more preferably used in an amount between 25 and 150 ppm, or between 30 to 125 ppm, for example 35, 45, 75, 100, or 110 ppm.

Acibenzolar-S-methyl is more preferably used in an amount of 2 to 150 ppm, preferably between 3 to 125, such as 4, 10, 20, 40, 70, 100 ppm.

In preferred embodiments saturated dicarboxylic acids, preferably azelaic acid is used and preferably in an amount of between 100 and 300 ppm, or between 150 and 250 ppm, such as 175, 200 or 225 ppm.

In preferred embodiments compounds comprising a nicotinic acid moiety, preferably 2,6-dichloro-isonicotinic acid is used, and preferably in an amount of between 50 and 400 ppm, or between 60 and 350 ppm, such as 75, 100, 150, 200, 250, 300, or 320 ppm.

In preferred embodiments non-proteinogenic aminoacids, preferably beta-aminobutyric acid is used, and preferably in an amount of between 50 and 400 ppm, or between 60 and 350 ppm, such as 75, 100, 150, 200, 250, 300, or 320 ppm.

In preferred embodiments compounds comprising a salicylate moiety, preferably salicylic acid, is used, and preferably in an amount of between 50 and 200 ppm, or between 80 and 150 ppm, such as 90, 100 or 125 ppm.

In preferred embodiments compounds comprising a benzoate moiety, preferably 2-amino-3,5-dichlorobenzoic acid (3,5-dichloroanthranilic acid) is used, and preferably in an amount of between 10 and 50 ppm, or between 20 and 30 ppm, like 22, or 25, or 27 ppm.

In preferred embodiments vitamins, preferably vitamin B1 is used, and preferably in an amount of between 6,000 and 10,000 ppm, or between 6,500 and 9,500 ppm, for example 7,000, 8,000 or 9,000 ppm.

In preferred embodiments compounds comprising a jasmonate moiety, preferably methyl jasmonate is used and preferably in an amount of between 400 and 800 ppm, or between 500 and 700 ppm, for example 550, 600 or 650 ppm.

Preferred compositions comprise at least one of the following combinations: laminarin and probenazole; laminarin and sodium saccharin, laminarin and dichlobentiazox, laminarin and isotianil, laminarin and tiadinil, laminarin and acibenzolar-S-methyl; laminarin and azelaic acid; laminarin and 2,6-dichloro-isonicotinic acid; laminarin and beta-aminobutyric acid; laminarin and salicylic acid; laminarin and 2-amino-3,5-dichlorobenzoic acid (3,5-dichloroanthranilic acid); laminarin and vitamin B1;

chitooligosaccharides and probenazole; chitooligosaccharides and sodium saccharin, chitooligosaccharides and dichlobentiazox, chitooligosaccharides and isotianil, chitooligosaccharides and tiadinil, chitooligosaccharides and acibenzolar-S-methyl; chitooligosaccharides and azelaic acid; chitooligosaccharides and 2,6-dichloro-isonicotinic acid; chitooligosaccharides and beta-aminobutyric acid; chitooligosaccharides and salicylic acid; chitooligosaccharides and 2-amino-3,5-dichlorobenzoic acid (3,5-dichloroanthranilic acid); chitooligosaccharides and methyl jasmonate;

carrageenans and sodium saccharin, carrageenans and probenazole; carrageenans and dichlobentiazox, carrageenans and acibenzolar-S-methyl; carrageenans and 2,6-dichloro-isonicotinic acid;

a mixture of chitooligosaccharides and oligogalacturonides and sodium saccharin, a mixture of chitooligosaccharides and oligogalacturonides and isotianil, a mixture of chitooligosaccharides and oligogalacturonides and tiadinil, a mixture of chitooligosaccharides and oligogalacturonides and acibenzolar-S-methyl; a mixture of chitooligosaccharides and oligogalacturonides and 2,6-dichloro-isonicotinic acid; a mixture of chitooligosaccharides and oligogalacturonides and 2-amino-3,5-dichlorobenzoic acid (3,5-dichloroanthranilic acid); a mixture of chitooligosaccharides and oligogalacturonides and vitamin B1; and a mixture of chitooligosaccharides and oligogalacturonides and methyl jasmonate;

flagellin and sodium saccharin, flagellin and isotianil, flagellin and acibenzolar-S-methyl, flagellin and 2,6-dichloro-isonicotinic acid, flagellin and beta-aminobutyric acid, flagellin and salicylic acid, flagellin and 2-amino-3,5- dichlorobenzoic acid (3,5-dichloroanthranilic acid), flagellin and vitamin B1, flagellin and methyl jasmonate;

harpin protein and sodium saccharin, harpin protein and isotianil, harpin protein and tiadinil, harpin protein and acibenzolar-S-methyl, harpin protein and 2,6-dichloro-isonicotinic acid, harpin protein and beta-aminobutyric acid, harpin protein and salicylic acid, harpin protein and 2-amino-3,5-dichlorobenzoic acid (3,5-dichloroanthranilic acid), harpin protein and vitamin B1;

wherein the PTI inductor and the SRI is present in the composition in any of the above defined amount.

The present invention further relates to the following embodiments defined as follows in the form of clauses:

Clause 1. A composition comprising a pathogen-associated molecular pattern-triggered immunity inductor and a systemic resistance inductor.

Clause 2. The composition according to clause 1, wherein the pattern-triggered immunity inductor is selected from the group of pathogen-associated molecular pattern inductors and damage associated molecular pattern inductors.

Clause 3. The composition according to any one of clauses 1-2, wherein pattern-triggered immunity inductor is selected from the group of polysaccharides and oligosaccharides, optionally extracted from biomass, flagellin, LAS117 strain of *Saccharomyces cerevisiae*, harpin protein and combinations thereof.

Clause 4. The composition according to any one of clauses 1-3, wherein the pattern-triggered immunity inductor is a polysaccharide and oligosaccharide, optionally extracted from biomass selected from the group of laminarin, chitosan, chitooligosaccharides, ulvans, fucoidans, carrageenans, oligopectins, oligogalacturonides and combinations thereof.

Clause 5. The composition according to any one of clauses 1-4, wherein the systemic resistance inductor is selected from the group of compounds comprising a benzoisothiazole moiety, compounds comprising an isothiazole moiety, compounds comprising a thiadiazole moiety, saturated dicarboxylic acids, compounds comprising a nicotinic acid moiety, compounds comprising a pyrazole moiety, non-proteinogenic aminoacids, compounds comprising a salicylate moiety, compounds comprising a benzoate moiety, vitamins, compounds comprising a jasmonate moiety and salts thereof.

Clause 6. The composition according to clause 5, wherein the systemic resistance inductor is selected from the group wherein the compounds comprising a benzoisothiazole moiety are selected from the group of probenazole, saccharin, sodium saccharin and dichlobentiazox; wherein the compounds comprising an isothiazole moiety are isotianil, isotianil metabolite 3,4-dichloro-1,2-thiazole-5-carboxylic acid; wherein the compounds comprising a thiadiazole moiety are selected from the group of tiadinil, tiadinil metabolite 4-methyl-1,2,3-thiadiazole-5-carboxylic acid and acibenzolar-S-methyl; wherein the saturated dicarboxylic acid is azelaic acid; wherein the compounds comprising a nicotinic acid moiety are selected from the group of 2,6-dichloro-isonicotinic acid and N-cyanomethyl-2-chloro isonicotinamide; wherein the compounds comprising a pyrazole moiety is 3-chloro-1-methyl-1H-pyrazole-5-carboxylic acid; wherein the non-proteinogenic aminoacid is beta-aminobutyric acid; wherein the compounds comprising a salicylate moiety are selected from the group of salicylic acid, 3,5-dichlorosalicylic acid, 4-chlorosalicylic acid, 5-chlorosalicylic acid, acetylsalicylic acid, and methyl salicylate; wherein the compounds comprising a benzoate moiety are selected from the group of p-aminobenzoic acid, 3-chlorobenzoic acid, 2-amino-3,5-dichlorobenzoic acid (3,5-dichloroanthranilic acid) and 3,5-dicholorobenzoic acid; wherein the vitamins are selected from the group of vitamin B1, menadione sodium bisulphite, compounds comprising a vitamin K3 moiety and vitamin B2; wherein the compounds comprising a jasmonate moiety are selected from the group of jasmonic acid, methyl jasmonate, propyl dihydrojasmonate, methyl dihydrojasmonate.

Clause 7. The composition according to any one of clauses 1-5 wherein the pattern-triggered immunity inductor is selected from the group of polysaccharides and oligosaccharides, optionally extracted from biomass, and flagellin; and wherein the systemic resistance inductor is selected from the group of compounds comprising a benzoisothiazole moiety, compounds comprising an isothiazole moiety, compounds comprising a thiadiazole moiety, saturated dicarboxylic acids, compounds comprising a nicotinic acid moiety and salts thereof.

Clause 8. The composition according to any one of clauses 1-5 wherein the pattern-triggered immunity inductor is selected from the group of polysaccharides and oligosaccharides, optionally extracted from biomass, LAS117 strain of *Saccharomyces cerevisiae* and harpin protein; and wherein the systemic resistance inductor is selected from the group of compounds comprising a benzoisothiazole moiety, non-proteinogenic aminoacids, compounds comprising a salicylate moiety, compounds comprising a benzoate moiety, vitamins, compounds comprising a jasmonate moiety and salts thereof.

Clause 9. The composition according to clause 8 wherein the pattern-triggered immunity inductor is selected from the group of polysaccharides and oligosaccharides, optionally extracted from biomass; and wherein the systemic resistance inductor is selected from the group of compounds comprising a benzoisothiazole moiety and salts thereof.

Clause 10. The composition according to clause 9 wherein the pattern-triggered immunity inductor is selected from the group of chitosans and chitooligosaccharides; and wherein the systemic resistance inductor is sodium saccharin.

Clause 11. The composition according to any one of clauses 1-10 wherein the weight ratio between the pattern-triggered immunity inductor and the systemic resistance inductor is from 10:1 to 1:10.

Clause 12. The composition according to clause 11 wherein the weight ratio between the pattern-triggered immunity inductor and the systemic resistance inductor is from 5:1 to 1:5.

Clause 13. The composition according to clause 12 wherein the weight ratio between the pattern-triggered immunity inductor and the systemic resistance inductor is from 1:1 to 1:5.

Clause 14. The composition according to any one of clauses 1-13 wherein the composition further comprises water.

Clause 15. Method of producing the composition as defined in any one of clauses 1-14 comprising mixing the pattern-triggered immunity inductor with the systemic resistance inductor.

Clause 16. Aqueous composition comprising a pattern-triggered immunity inductor, a systemic resistance inductor and water.

Clause 17. The composition according to clause 16 wherein the pattern-triggered immunity inductor is selected from the group of pathogen-associated molecular pattern inductors and damage associated molecular pattern inductors.

Clause 18. The composition according to any one of clauses 16-17 wherein the pattern-triggered immunity inductor is selected from the group of polysaccharides and oligosaccharides, optionally extracted from biomass, flagellin, LAS117 strain of *Saccharomyces cerevisiae*, harpin protein and combinations thereof.

Clause 19. The composition according to any one of clauses 16-18, wherein the pattern-triggered immunity inductor is a polysaccharide and oligosaccharide, optionally extracted from biomass, selected from the group of laminarin, chitosan, chitooligosaccharides, ulvans, fucoidans, carrageenans, oligopectins, oligogalacturonides and combinations thereof.

Clause 20. The composition according to any one of clauses 16-19, wherein the systemic resistance inductor is selected from the group of compounds comprising a benzoisothiazole moiety, compounds comprising an isothiazole moiety, compounds comprising a thiadiazole moiety, saturated dicarboxylic acids, compounds comprising a nicotinic acid moiety, compounds comprising a pyrazole moiety, non-proteinogenic aminoacids, compounds comprising a salicylate moiety, compounds comprising a benzoate moiety, vitamins, compounds comprising a jasmonate moiety and salts thereof.

Clause 21. The composition according to clause 20, wherein the systemic resistance inductor is selected from the group wherein the compounds comprising a benzoisothiazole moiety are selected from the group of probenazole, saccharin, sodium saccharin and dichlobentiazox; wherein the compounds comprising an isothiazole moiety are isotianil, isotianil metabolite 3,4-dichloro-1,2-thiazole-5-carboxylic acid; wherein the compounds comprising a thiadiazole moiety are selected from the group of tiadinil, tiadinil metabolite 4-methyl-1,2,3-thiadiazole-5-carboxylic acid (SV-03) and acibenzolar-S-methyl; wherein the saturated dicarboxylic acid is azelaic acid; wherein the compounds comprising a nicotinic acid moiety are selected from the group of 2, 6-dichloro-isonicotinic acid and N-cyanomethyl-2-chloro isonicotinamide; wherein the compounds comprising a pyrazole moiety is 3-chloro-1-methyl-1H-pyrazole-5-carboxylic acid; wherein the non-proteinogenic aminoacid is beta-aminobutyric acid; wherein the compounds comprising a salicylate moiety are selected from the group of salicylic acid, 3,5-dichlorosalicylic acid, 4-chlorosalicylic acid, 5-chlorosalicylic acid, acetylsalicylic acid, and methyl salicylate; wherein the compounds comprising a benzoate moiety are selected from the group of p-aminobenzoic acid, 3-chlorobenzoic acid, 2-amino-3,5-dichlorobenzoic acid (3,5-dichloroanthranilic acid) and 3,5-dicholorobenzoic acid; wherein the vitamins are selected from the group of vitamin B1, menadione sodium bisulphite, compounds comprising a vitamin K3 moiety and vitamin B2; wherein the compounds comprising a jasmonate moiety are selected from the group of jasmonic acid, methyl jasmonate, propyl dihydrojasmonate, methyl dihydrojasmonate.

Clause 22. The composition according to any one of clauses 16-19 wherein the pattern-triggered immunity inductor is selected from the group of polysaccharides and oligosaccharides, optionally extracted from biomass, and flagellin; and wherein the systemic resistance inductor is selected from the group of compounds comprising a benzoisothiazole moiety, compounds comprising an isothiazole moiety, compounds comprising a thiadiazole moiety, saturated dicarboxylic acids, compounds comprising a nicotinic acid moiety and salts thereof.

Clause 23. The composition according to any one of clauses 16-19 wherein the pattern-triggered immunity inductor is selected from the group of polysaccharides and oligosaccharides, optionally extracted from biomass, LAS117 strain of *Saccharomyces cerevisiae* and harpin protein; and wherein the systemic resistance inductor is selected from the group of substituted benzoisothiazoles, non-proteinogenic aminoacids, substituted compounds comprising a salicylate moiety, compounds comprising a benzoate moiety, vitamins, compounds comprising a jasmonate moiety and salts thereof.

Clause 24. The composition according to clause 23 wherein pattern-triggered immunity inductor is selected from the group of polysaccharides and oligosaccharides, optionally extracted from biomass; and wherein the systemic resistance inductor is selected from the group of compounds comprising a benzoisothiazole moiety and salts thereof.

Clause 25. The composition according to clause 24 wherein the pattern-triggered immunity inductor is selected from the group of chitosans and chitooligosaccharides; and wherein the systemic resistance inductor is sodium saccharin.

Clause 26. The composition according to any one of clauses 16-25 wherein the concentration by weight of the pattern-triggered immunity inductor and the systemic resistance inductor is from 1 ppm to 95% in weight.

Clause 27. The composition according to any one of clauses 16-26 wherein the concentration by weight of the pattern-triggered immunity inductor is from 50 ppm to 1% and the concentration by weight systemic of the resistance inductor is from 100 ppm to 2%.

Clause 28. The composition according to any one of clauses 16-25 wherein the concentration by weight of the pattern-triggered immunity inductor is from 50 ppm to 500 ppm and the concentration by weight systemic of the resistance inductor is from 100 ppm to 1%.

The present invention further discloses the use of the compositions above defined: Clause 29. Use of the composition as defined in any one of clauses 1-28 for improving plant defense.

Clause 30. Use of the composition as defined in any one of clauses 1-28 for increasing plant defense mechanisms.

Clause 31. Use of the composition as defined in any one of clauses 1-28 for activating plant resistance against pathogens.

Further, the present invention relates as well to the use of a kit:

Clause 32. A kit for providing an agricultural composition comprising the following components: (a) a pattern-triggered immunity inductor; and (b) a systemic resistance inductor.

Clause 33. A use of a kit as defined in clause 32 for applying the agricultural composition to seeds, plants and crops.

EXAMPLES

Wild-type *Arabidopsis thaliana* Col-0 seeds were grown in pots under a 16 hours day/8 hours night (long day) photoperiod, with a daytime temperature of 22° C., a night temperature of 20° C., and a relative humidity of 65%. Plants were sprayed with each inductor dissolved in water (inductors alone or in combination). 24 and 48 hours after treatment (hours post treatment, hpt), tissue samples were harvested and gene expression analysis of specific defense marker genes was performed, through quantitative PCR technology (qPCR).

The genes involved in plant defense analyzed were one or more of the following 5:
PR1 (PATHOGENESIS-RELATED PROTEIN 1). AGI code: AT2G14610
PDF1.2 (PLANT DEFENSIN 1.2). AGI code: AT5G44420
PR2 (PATHOGENESIS-RELATED PROTEIN 2; BETA-1,3-GLUCANASE 2). AGI code: AT3G57260
PR5 (PATHOGENESIS-RELATED GENE 5). AGI code: AT1G75040
ICS1 (ISOCHORISMATE SYNTHASE 1). AGI code: AT1G74710
UBC21 (UBIQUITIN-CONJUGATING ENZYME 21; AGI code: AT5G25760) was the normalization (or housekeeping) gene used.

PR1 (Salicylic acid-signaling pathway marker gene) and PDF1.2 (Jasmonic acid-signaling pathway marker gene) are important marker genes of plant defense system, because they are necessary to plant defense mechanisms activation.

In order to evaluate if there is a synergistic effect between different possible combinations, Limpel/Colby's formula was used. This formula is used to calculated the expected activity of combinations containing two active ingredients, A and B:

Expected $(E)=A+B-(A\times B/100)$

Wherein,
A=observed gene activation of active component A at the same concentration as used in the mixture
B=observed gene activation of active component B at the same concentration as used in the mixture When the activity found experimentally (observed) is greater than the value of E, said activity should be considered as being a synergistic effect, and Synergy Factor (F) is >1:

Synergy Factor $(F)$=Observed activity/Expected activity $(E)$

In the following experiments the synergistic effect was demonstrated with respect to at least one of the above mentioned defense marker genes.

In the following:
OV: Observed gene activation value
CEV: Colby expected gene activation value with the mixture [CEV=A+B−(A×B/100)]

Synergy Factor $(F)=OV(A+B)/CEV(A+B)$ hpt: hours post treatment.

Compositions with Laminarin, or Chitooligosaccharides or a Mixture of Chitooligosaccharides and Oligogalacturonides, or Flagellin or Harpin Protein and with a SRI

TABLE 1

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV (A+B) | Synergy Factor (F) | OV | | | CEV (A+B) | Synergy Factor (F) |
| | | | | A | B | A+B | | | A | B | A+B | | |
| Laminarin + Sodium saccharin | 135 | 100 | 48 | 5.64 | 5.19 | 11.52 | 10.54 | 1.09 | — | — | — | — | — |
| Laminarin + Probenazole | 135 | 100 | 48 | 5.64 | 102.9 | 1010.37 | 102.74 | 9.83 | — | — | — | — | — |
| Laminarin + Isotianil | 135 | 30 | 24 | — | — | — | — | — | 23.46 | 18.22 | 82.52 | 37.41 | 2.21 |
| | | | 48 | — | — | — | — | — | 1.38 | 57.21 | 152.10 | 57.80 | 2.63 |
| Laminarin + Tiadinil | 135 | 45 | 24 | — | — | — | — | — | 23.46 | 189.33 | 565.75 | 168.37 | 3.36 |
| Laminarin + Acibenzolar-S-methyl | 135 | 37.5 | 24 | 5.19 | 32.19 | 43.60 | 35.71 | 1.22 | — | — | — | — | — |
| Laminarin + Azelaic acid | 135 | 200 | 48 | — | — | — | — | — | 1.38 | 87.56 | 214.95 | 87.73 | 2.45 |
| Laminarin + 2,6-Dichloroisonicotinic acid | 135 | 75 | 48 | 5.64 | 26.64 | 71.95 | 30.78 | 2.34 | 1.38 | 1.68 | 19.47 | 3.04 | 6.41 |
| Laminarin + Beta-Aminobutyric acid | 135 | 100 | 24 | 5.19 | 2.53 | 8.55 | 7.59 | 1.13 | — | — | — | — | — |
| | | | 48 | — | — | — | — | — | 1.38 | 4.37 | 8.31 | 5.69 | 1.46 |
| Laminarin + Salicylic acid | 135 | 100 | 24 | — | — | — | — | — | 23.46 | 12.69 | 118.80 | 33.17 | 3.58 |
| | | | 48 | — | — | — | — | — | 1.38 | 7.80 | 14.01 | 9.07 | 1.54 |
| Laminarin + 3,5-Dichloroanthranilic acid | 135 | 25 | 48 | 5.64 | 4.14 | 10.93 | 9.55 | 1.14 | 1.38 | 5.70 | 15.63 | 7.00 | 2.23 |
| Laminarin + Vitamin B1 | 135 | 8000 | 24 | — | — | — | — | — | 23.46 | 231.82 | 486.04 | 200.90 | 2.42 |
| | | | 48 | — | — | — | — | — | 1.38 | 319.68 | 889.22 | 316.65 | 2.81 |

TABLE 2

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV | Synergy Factor | OV | | | CEV | Synergy Factor |
| | | | | A | B | A + B | (A + B) | (F) | A | B | A + B | (A + B) | (F) |
| Chitooligosaccharides + Probenazole | 100 | 100 | 48 | 1.46 | 102.90 | 379.94 | 102.86 | 3.69 | — | — | — | — | — |
| Chitooligosaccharides + Isotianil | 100 | 30 | 24 | — | — | — | — | — | 1.06 | 18.22 | 71.04 | 19.09 | 3.72 |
| | | | 48 | — | — | — | — | — | 1.07 | 57.21 | 223.27 | 57.67 | 3.87 |
| Chitooligosaccharides + Acibenzolar-S-methyl | 100 | 37.5 | 24 | 2.76 | 32.19 | 38.88 | 34.10 | 1.14 | — | — | — | — | — |
| Chitooligosaccharides + Azelaic acid | 100 | 200 | 24 | — | — | — | — | — | 1.06 | 331.01 | 429.92 | 328.56 | 1.31 |
| Chitooligosaccharides + 2,6-Dichloroisonicotinic acid | 100 | 75 | 24 | 2.76 | 15.45 | 18.87 | 17.78 | 1.06 | 1.06 | 5.13 | 25.17 | 6.14 | 4.10 |
| | | | 48 | — | — | — | — | — | 1.07 | 1.68 | 9.23 | 2.73 | 3.38 |
| Chitooligosaccharides + Beta-Aminobutyric acid | 100 | 100 | 24 | 2.76 | 2.53 | 8.79 | 5.22 | 1.68 | — | — | — | — | — |
| | | | 48 | 1.46 | 8.50 | 12.63 | 9.84 | 1.28 | 1.07 | 4.37 | 11.99 | 5.39 | 2.22 |
| Chitooligosaccharides + Salicylic acid | 100 | 100 | 24 | — | — | — | — | — | 1.06 | 12.69 | 17.24 | 13.62 | 1.27 |
| | | | 48 | 1.46 | 58.77 | 63.21 | 59.37 | 1.06 | 1.07 | 7.80 | 17.06 | 8.79 | 1.94 |
| Chitooligosaccharides + 3,5-Dichloroanthranilic acid | 100 | 25 | 48 | — | — | — | — | — | 1.07 | 5.70 | 20.31 | 6.71 | 3.03 |
| Chitooligosaccharides + Methyl jasmonate | 100 | 600 | 24 | 2.76 | 1.10 | 4.92 | 3.83 | 1.28 | 1.06 | 6.93 | 34.92 | 7.92 | 4.41 |

TABLE 3

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV | Synergy Factor | OV | | | CEV | Synergy Factor |
| | | | | A | B | A + B | (A + B) | (F) | A | B | A + B | (A + B) | (F) |
| Chitooligosaccharides and oligogalacturonides complex + Sodium saccharin | 37.5 | 100 | 48 | 1.58 | 5.19 | 10.01 | 6.69 | 1.50 | — | — | — | — | — |
| Chitooligosaccharides and oligogalacturonides complex + Isotianil | 37.5 | 30 | 24 | — | — | — | — | — | 5.65 | 18.22 | 33.39 | 22.84 | 1.46 |
| | | | 48 | — | — | — | — | — | 1.59 | 57.21 | 201.66 | 57.89 | 3.48 |
| Chitooligosaccharides and oligogalacturonides complex + Tiadinil | 37.5 | 45 | 24 | — | — | — | — | — | 5.65 | 189.33 | 198.26 | 184.28 | 1.08 |
| Chitooligosaccharides and oligogalacturonides complex + Acibenzolar-S-methyl | 37.5 | 37.5 | 24 | 0.84 | 32.19 | 46.87 | 32.80 | 1.43 | — | — | — | — | — |
| Chitooligosaccharides and oligogalacturonides complex + 2,6-Dichloroiso-nicotinic acid | 37.5 | 75 | 48 | 1.58 | 26.64 | 36.51 | 27.8 | 1.31 | 1.59 | 1.68 | 4.03 | 3.24 | 1.24 |
| Chitooligosaccharides and oligogalacturonides complex + 3,5-Dichloro-anthranilic acid | 37.5 | 25 | 24 | 0.84 | 4.61 | 5.55 | 5.41 | 1.03 | — | — | — | — | — |
| | | | 48 | 1.58 | 4.14 | 6.22 | 5.65 | 1.10 | — | — | — | — | — |

TABLE 3-continued

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV | Synergy Factor | OV | | | CEV | Synergy Factor |
| | | | | A | B | A + B | (A + B) | (F) | A | B | A + B | (A + B) | (F) |
| Chitooligosaccharides and oligogalacturonides complex + Vitamin B1 | 37.5 | 8000 | 24 | — | — | — | — | — | 5.65 | 231.82 | 391.50 | 224.37 | 1.74 |
| Chitooligosaccharides and oligogalacturonides complex + Methyl jasmonate | 37.5 | 600 | 24 | 0.84 | 1.10 | 4.37 | 1.93 | 2.26 | — | — | — | — | — |

TABLE 4

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV | Synergy Factor | OV | | | CEV | Synergy Factor |
| | | | | A | B | A + B | (A + B) | (F) | A | B | A + B | (A + B) | (F) |
| Flagellin + Sodium saccharin | 2.3 | 300 | 48 | 5.89 | 247.33 | 262.78 | 238.65 | 1.10 | — | — | — | — | — |
| Flagellin + Isotianil | 2.3 | 30 | 48 | — | — | — | — | — | 0.94 | 57.21 | 386.84 | 57.61 | 6.71 |
| Flagellin + Acibenzolar-S-methyl | 2.3 | 37.5 | 24 | 2.05 | 32.19 | 186.45 | 33.58 | 5.55 | — | — | — | — | — |
| | | | 48 | 5.89 | 72.31 | 113.34 | 73.94 | 1.53 | — | — | — | — | — |
| Flagellin + 2,6-Dichloroisonicotinic acid | 2.3 | 75 | 24 | 2.05 | 15.45 | 20.78 | 17.18 | 1.21 | — | — | — | — | — |
| Flagellin + Beta-Aminobutyric acid | 2.3 | 100 | 24 | 2.05 | 2.53 | 22.76 | 4.53 | 5.03 | — | — | — | — | — |
| | | | 48 | 5.89 | 8.50 | 32.24 | 13.89 | 2.32 | 0.94 | 4.37 | 11.99 | 5.27 | 2.28 |
| Flagellin + Salicylic acid | 2.3 | 100 | 24 | 2.05 | 87.08 | 300.19 | 87.34 | 3.44 | 1.44 | 12.69 | 19.08 | 13.95 | 1.37 |
| | | | 48 | 5.89 | 58.77 | 69.52 | 61.20 | 1.14 | — | — | — | — | — |
| Flagellin + 3,5-Dichloroanthranilic acid | 2.3 | 25 | 48 | 5.89 | 4.14 | 21.99 | 9.79 | 2.25 | 0.94 | 5.70 | 166.30 | 6.59 | 25.25 |
| Flagellin + Vitamin B1 | 2.3 | 8000 | 24 | 2.05 | 8.35 | 27.09 | 10.23 | 2.65 | 1.44 | 231.82 | 884.44 | 229.92 | 3.85 |
| | | | 48 | — | — | — | — | — | 0.94 | 319.68 | 1416.86 | 317.62 | 4.46 |
| Flagellin + Methyl jasmonate | 2.3 | 600 | 48 | 5.89 | 36.36 | 60.84 | 40.11 | 1.52 | — | — | — | — | — |

TABLE 5

| Compound A + B | Conc. A (ppm) | Conc. B (ppm) | Sampling time (hpt) | PR1 gene activation (n-fold against control with water) | | | | | PDF1.2 gene activation (n-fold against control with water) | | | | |
|---|---|---|---|---|---|---|---|---|---|---|---|---|---|
| | | | | OV | | | CEV | Synergy Factor | OV | | | CEV | Synergy Factor |
| | | | | A | B | A + B | (A + B) | (F) | A | B | A + B | (A + B) | (F) |
| Harpin protein + Sodium saccharin | 1.5 | 300 | 48 | 4.40 | 247.33 | 701.68 | 240.85 | 2.91 | — | — | — | — | — |
| Harpin protein + Isotianil | 1.5 | 30 | 24 | — | — | — | — | — | 9.62 | 18.22 | 37.46 | 26.09 | 1.44 |
| | | | 48 | — | — | — | — | — | 45.05 | 57.21 | 359.29 | 76.49 | 4.70 |
| Harpin protein + Tiadinil | 1.5 | 45 | 24 | — | — | — | — | — | 9.62 | 189.33 | 214.66 | 180.74 | 1.19 |

TABLE 5-continued

| Compound A + B | Conc. A (ppm) | Conc. B (ppm) | Sampling time (hpt) | PR1 gene activation (n-fold against control with water) | | | | Synergy Factor (F) | PDF1.2 gene activation (n-fold against control with water) | | | | Synergy Factor (F) |
|---|---|---|---|---|---|---|---|---|---|---|---|---|---|
| | | | | A | B | A + B (OV) | CEV (A + B) | | A | B | A + B (OV) | CEV (A + B) | |
| Harpin protein + Acibenzolar-S-methyl | 1.5 | 37.5 | 24 | 2.90 | 32.19 | 47.24 | 34.16 | 1.38 | — | — | — | — | — |
| | | | 48 | 4.40 | 72.31 | 416.73 | 73.53 | 5.67 | — | — | — | — | — |
| Harpin protein + 2,6-Dichloroiso-nicotinic acid | 1.5 | 75 | 24 | 2.90 | 15.45 | 23.14 | 17.90 | 1.29 | — | — | — | — | — |
| | | | 48 | 4.40 | 26.64 | 52.73 | 29.87 | 1.77 | — | — | — | — | — |
| Harpin protein + Beta-Aminobutyric acid | 1.5 | 100 | 24 | 2.90 | 2.53 | 11.21 | 5.36 | 2.09 | — | — | — | — | — |
| | | | 48 | 4.40 | 8.50 | 14.42 | 12.53 | 1.15 | 45.05 | 4.37 | 128.37 | 47.45 | 2.71 |
| Harpin protein + Salicylic acid | 1.5 | 100 | 24 | 2.90 | 87.08 | 163.14 | 87.45 | 1.87 | — | — | — | — | — |
| | | | 48 | 4.40 | 58.77 | 270.29 | 60.58 | 4.46 | 45.05 | 7.80 | 51.59 | 49.34 | 1.05 |
| Harpin protein + 3,5-Dichloro-anthranilic acid | 1.5 | 25 | 48 | — | — | — | — | — | 45.05 | 5.70 | 101.01 | 48.18 | 2.10 |
| Harpin protein + Vitamin B1 | 1.5 | 8000 | 24 | — | — | — | — | — | 9.62 | 231.82 | 454.94 | 219.14 | 2.08 |
| | | | 48 | — | — | — | — | — | 45.05 | 319.68 | 467.30 | 220.71 | 2.12 |

Composition Comprising Chitooligosaccharides and Sodium Saccharin

The inductors mixtures analyzed were three different mixtures and a control:

T1: 100 ppm of Chitooligosaccharides, dissolved in water [pattern-triggered inductor]

T2: 300 ppm of sodium saccharin, dissolved in water [systemic resistance inductor]

T3: 100 ppm of Chitooligosaccharides+300 ppm of sodium saccharin, dissolved all together in water [pattern-triggered inductor and systemic resistance inductor]

T4: water (control)

The composition comprising a pattern-triggered immunity inductor and a systemic resistance inductor in the same treatment (T3) causes a significant increase in the expression of the four marker genes analysed, much greater than expression obtained when we treat with the inductors separately (T1 and T2). Thus, the mixture of inductors provides a synergistic effect, since the value obtained with the mixture in the four genes analyzed is greater than a simple sum of each of the inductors when used independently.

Figure 2:
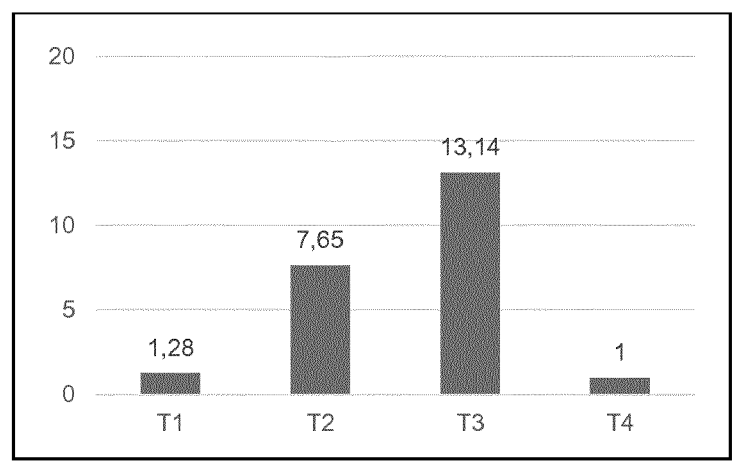
FIG. 2 is a bar diagram that shows the expression of gene ICS1 in the plant *Arabidopsis thaliana* in four different conditions: T1, T2, T3, T4. In T1, the plant has been treated with 100 ppm of chitooligosaccharides dissolved in water; in T2, the treatment of the plant is performed with 300 ppm of sodium saccharin in water; in T3, according to the invention, the plant has been treated with a water solution consisting of 100 ppm of chitooligosacharides and 300 ppm of sodium saccharide; in T4, the plant has been treated with water, as a control. In the y-axis the values represent how many times more the study gene is expressed in the samples treated with inductor with respect to the control samples (n-fold versus control).
Figure 3:
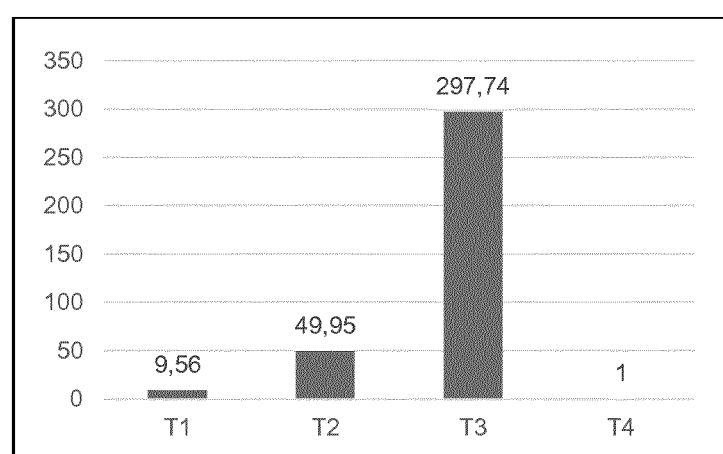
FIG. 3 is a bar diagram that shows the expression of gene PR2 in the plant *Arabidopsis thaliana* in four different conditions: T1, T2, T3, T4. In T1, the plant has been treated with 100 ppm of chitooligosaccharides dissolved in water; in T2, the treatment of the plant is performed with 300 ppm of sodium saccharin in water; in T3, according to the invention, the plant has been treated with a water solution consisting of 100 ppm of chitooligosacharides and 300 ppm of sodium saccharide; in T4, the plant has been treated with water, as a control. In the y-axis the values represent how many times more the study gene is expressed in the samples treated with inductor with respect to the control samples (n-fold versus control).
Figure 4:
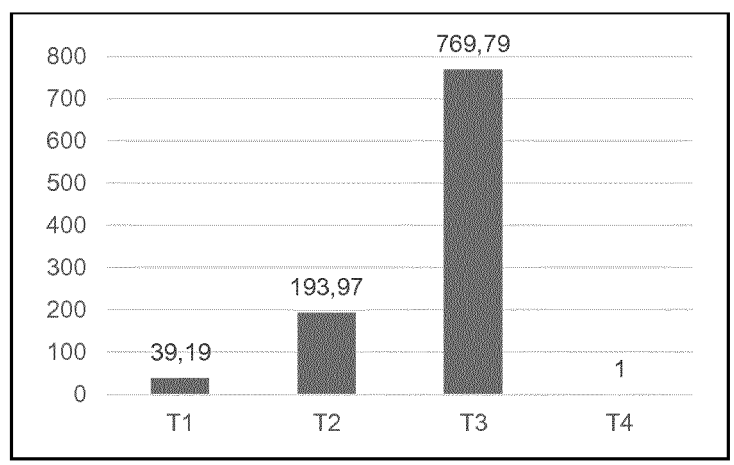
FIG. 4 is a bar diagram that shows the expression of gene PR5 in the plant *Arabidopsis thaliana* in four different conditions: T1, T2, T3, T4. In T1, the plant has been treated with 100 ppm of chitooligosaccharides dissolved in water; in T2, the treatment of the plant is performed with 300 ppm of sodium saccharin in water; in T3, according to the invention, the plant has been treated with a water solution consisting of 100 ppm of chitooligosacharides and 300 ppm of sodium saccharide; in T4, the plant has been treated with water, as a control. In the y-axis the values represent how many times more the study gene is expressed in the samples treated with inductor with respect to the control samples (n-fold versus control).

The Figures show the expression of each gene (FIG. 1 corresponds to PR1 gene expression, FIG. 2 to ICS1 gene expression, FIG. 3 to PR2 gene expression and FIG. 4 to PR5 gene expression, respectively) according to each treatment, and compared to the value obtained with the water treatment (control). The values represent how many times more the study gene is expressed in the samples treated with inductor with respect to the control samples (n-fold versus control). Thereby, T1, T2 and T3 values in FIG. 1 are 2.88; 94.28 and 210.71, respectively; T1, T2 and T3 values in FIG. 2 are 1.28; 7.65 and 13.14, respectively; T1, T2 and T3 values in FIG. 3 are 9.56; 49.95 and 297.74, respectively; and T1, T2 and T3 values in FIG. 4 are 39.19; 193.97 and 769.79, respectively. Note that in all the cases, the increase in gene expression while treating the plants with the combination of chitooligosaccharides, a PTI inductor, and sodium saccharine, a SR inductor (T3), according to the invention, is significantly increased (p-value <0.05) from the treatment of either of the components alone (T1, T2) or the theoretical sum of the expression values of the components alone (T1+T2). Thus, the mixture of the two compounds has a synergistic effect on the expression of said genes in plants.

These results are shown in the following tables:

Gene: PR1 (PATHOGENESIS-RELATED PROTEIN 1)

| Compound A + B | Conc. A (ppm) | Conc. B (ppm) | Sampling time (hpt) | PR1 gene activation (n-fold against control with water) | | | | Synergy Factor (F) |
|---|---|---|---|---|---|---|---|---|
| | | | | A | B | A + B (OV) | CEV (A + B) | |
| Chitooligosaccharides + Sodium saccharin | 100 | 300 | 48 | 1.46 | 94.28 | 210.72 | 94.36 | 2.23 |

| Gene: ICS1 (ISOCHORISMATE SYNTHASE 1) | | | | | | | |
|---|---|---|---|---|---|---|---|
| | | | | ICS1 gene activation (n-fold against control with water) | | | |
| | Conc. | Conc. | Sampling | OV | | CEV | Synergy |
| Compound | A | B | time | | | | Factor |
| A + B | (ppm) | (ppm) | (hpt) | A | B | A + B | (A + B) | (F) |
| Chitooligosaccharides + Sodium saccharin | 100 | 300 | 48 | 1.28 | 7.65 | 13.14 | 8.83 | 1.49 |

| Gene: PR2 (PATHOGENESIS-RELATED PROTEIN 2; BETA-1,3-GLUCANASE 2) | | | | | | | |
|---|---|---|---|---|---|---|---|
| | | | | PR2 gene activation (n-fold against control with water) | | | |
| | Conc. | Conc. | Sampling | OV | | CEV | Synergy |
| Compound | A | B | time | | | | Factor |
| A + B | (ppm) | (ppm) | (hpt) | A | B | A + B | (A + B) | (F) |
| Chitooligosaccharides + Sodium saccharin | 100 | 300 | 48 | 9.56 | 49.95 | 297.74 | 54.73 | 5.44 |

| Gene: PR5 (PATHOGENESIS-RELATED GENE 5) | | | | | | | |
|---|---|---|---|---|---|---|---|
| | | | | PR5 gene activation (n-fold against control with water) | | | |
| | Conc. | Conc. | Sampling | OV | | CEV | Synergy |
| Compound | A | B | time | | | | Factor |
| A + B | (ppm) | (ppm) | (hpt) | A | B | A + B | (A + B) | (F) |
| Chitooligosaccharides + Sodium saccharin | 100 | 300 | 48 | 39.19 | 193.97 | 769.79 | 157.14 | 4.90 |

Tests with Pathogens

The following tests with pathogens and the following combinations were carried out:

1. *Podosphaera xanthii* on cucumber (Powdery mildew on cucumber)
   Chitooligosaccharides+Sodium saccharin
   Chitooligosaccharides+Dichlobentiazox
   Chitooligosaccharides+Probenazole
   Chitooligosaccharides+Isotianil
   Chitooligosaccharides+Tiadinil
   Chitooligosaccharides+Beta-aminobutyric acid
   Laminarin+Sodium saccharin
   Carrageenan+Sodium saccharin
2. *Pseudomonas syringae* pv. *Lachrymans* on cucumber (Bacterial spot on cucumber)
   Chitooligosaccharides+Sodium saccharin
   Chitooligosaccharides+Probenazole
   Chitooligosaccharides+Acibenzolar-S-methyl
3. *Puccinia recondita* on wheat (Brown rust on wheat)
   Chitooligosaccharides+Sodium saccharin
4. *Blumeria graminis* f. sp. *Tritici* on wheat (Powdery mildew on wheat)
   Chitooligosaccharides+Sodium saccharin
5. *Pyricularia oryzae* on rice (Rice blast)
   Chitooligosaccharides+Sodium saccharin
   Chitooligosaccharides+Probenazole
   Chitooligosaccharides+Isotianil
   Chitooligosaccharides+Acibenzolar-S-methyl
   Chitooligosaccharides+Beta-aminobutyric acid
   Laminarin+Acibenzolar-S-methyl
   Laminarin+Beta-aminobutyric acid
   Carrageenan+Probenazole
   Carrageenan+Isotianil
   Carrageenan+Tiadinil
   Carrageenan+Acibenzolar-S-methyl
   Carrageenan+Beta-aminobutyric acid
6. *Pseudomonas cannbina* pv. *alisalensis* on Chinese cabbage (Bacterial blight on Chinese cabbage)
   Chitooligosaccharides+Sodium saccharin
   Chitooligosaccharides+Dichlobentiazox
   Chitooligosaccharides+Acibenzolar-S-methyl
   Chitooligosaccharides+2,6-dichloroisonicotinic acid
   Chitooligosaccharides+Beta-aminobutyric acid
   Laminarin+Probenazole
   Laminarin+Dichlobentiazox
   Laminarin+2,6-dichloroisonicotinic acid
   Carrageenan+Sodium saccharin
   Carrageenan+Probenazole Carrageenan+Dichlobentiazox
Carrageenan+Acibenzolar-S-methyl
Carrageenan+2,6-dichloroisonicotinic acid
7. *Colletotrichum orbiculare* on cucumber (Anthracnose on cucumber)
Chitooligosaccharides+Acibenzolar-S-methyl
8. *Phakopsora pachyrhizi* on soybean (Asian rust on soybean)
Chitooligosaccharides+Probenazole
Chitooligosaccharides+Dichlobentiazox
Chitooligosaccharides+Isotianil
Chitooligosaccharides+Beta-aminobutyric acid
Laminarin+Probenazole
Laminarin+Isotianil
Carrageenan+Isotianil General Methodology:

The experiments were carried out under controlled greenhouse conditions. The effects of temperature, humidity and light conditions in the greenhouse chambers were adjusted according to host plants and pathogens needs.

The efficacy or disease control value (W) was calculated according to Abbott's formula:

$$W=(1-x/y) \times 100$$

wherein
x=percentage of fungal or bacterial infection in treated plants
y=percentage of fungal or bacterial infection in untreated control plants An efficacy of 0 means the infection level of the treated plants corresponds to that of the untreated control plants; and efficacy of 100 means that the treated plants are not infected.

In order to evaluate if there is a synergistic effect between different possible combinations, Limpel/Colby's formula was used. This formula is used to calculated the expected disease control value of combinations containing two active ingredients, A and B:

$$\text{Expected } (E)=A+B-(A \times B/100)$$

wherein,
A=observed disease control value of component A, at the same concentration as used in the mixture
B=observed disease control value of component B, at the same concentration as used in the mixture When the disease control value found experimentally (observed) with the combination is greater than the value of E, said activity should be considered as being a synergistic effect, and Synergy Factor (F) is >1:

Synergy Factor $(F)$=Observed disease control value/ Expected disease control value $(E)$ Thus, a synergistic effect exists whenever the efficacy of a combination containing two active ingredients is greater than the sum of the efficacy of the individual components.

As above, in the following Tables:
OV: Observed control value
CEV: Colby expected control value with the mixture [CEV=A+B−(A×B/100)]

Synergy Factor $(F)=OV(A+B)/CEV(A+B)$

1. *Podosphaera xanthii* on Cucumber
Disease: Powdery mildew on cucumber
Methodology:

1.2-leaf stage cucumber plants (cv. Suzunari-suyo), grown in pots under controlled conditions, were treated by spraying of the leaves or by soil drenching with the mixture in question, dispersed in an aqueous solution. Plants were kept in a growth chamber at 25° C. and 80% RH. After 7 days, plants were inoculated and infected with a spore suspension of *Podosphaera xanthii*, and, 10 days after pathogen inoculation, infection levels were assessed and percentages of disease control and expected values were calculated according to Abbott's and Colby's formulas, respectively.

Results

Combinations with Chitooligosaccharides:

| | Compound A + B | Conc. A (ppm) | Conc. B (ppm) | Percentage of disease control | | | | Synergy Factor (F) |
|---|---|---|---|---|---|---|---|---|
| | | | | OV | | | CEV | |
| | | | | A | B | A + B | (A + B) | |
| Test 1 (spray treatment) | Chitooligosaccharides + Sodium saccharin | 100 | 200 | 0 | 63 | 80 | 63 | 1.27 |
| | Chitooligosaccharides + Sodium saccharin | 100 | 300 | 0 | 60 | 83 | 60 | 1.38 |
| | Chitooligosaccharides + Sodium saccharin | 200 | 100 | 7 | 67 | 83 | 69 | 1.20 |
| | Chitooligosaccharides + Sodium saccharin | 200 | 200 | 7 | 63 | 80 | 66 | 1.21 |
| | Chitooligosaccharides + Sodium saccharin | 200 | 300 | 7 | 60 | 90 | 63 | 1.43 |
| | Chitooligosaccharides + Sodium saccharin | 300 | 40 | 0 | 60 | 63 | 60 | 1.05 |
| | Chitooligosaccharides + Sodium saccharin | 300 | 100 | 0 | 67 | 70 | 67 | 1.04 |
| | Chitooligosaccharides + Sodium saccharin | 300 | 200 | 0 | 63 | 87 | 63 | 1.38 |
| | Chitooligosaccharides + Sodium saccharin | 300 | 300 | 0 | 60 | 83 | 60 | 1.38 |
| Test 2 (spray treatment) | Chitooligosaccharides + Sodium saccharin | 100 | 100 | 0 | 67 | 77 | 67 | 1.15 |
| | Chitooligosaccharides + Sodium saccharin | 100 | 200 | 0 | 80 | 83 | 80 | 1.04 |
| | Chitooligosaccharides + Sodium saccharin | 100 | 300 | 0 | 80 | 98 | 80 | 1.23 |

-continued

|  | Compound A + B | Conc. A (ppm) | Conc. B (ppm) | Percentage of disease control | | | | Synergy Factor (F) |
|---|---|---|---|---|---|---|---|---|
|  |  |  |  | OV | | | CEV | |
|  |  |  |  | A | B | A + B | (A + B) | |
|  | Chitooligosaccharides + Sodium saccharin | 200 | 100 | 13 | 67 | 93 | 71 | 1.31 |
|  | Chitooligosaccharides + Sodium saccharin | 200 | 200 | 13 | 80 | 93 | 83 | 1.12 |
|  | Chitooligosaccharides + Sodium saccharin | 300 | 200 | 3 | 80 | 88 | 81 | 1.09 |
|  | Chitooligosaccharides + Sodium saccharin | 300 | 300 | 3 | 80 | 83 | 81 | 1.02 |
| Test 3 (soil drench treatment) | Chitooligosaccharides + Sodium saccharin | 100 | 300 | 33 | 53 | 73 | 69 | 1.06 |
|  | Chitooligosaccharides + Dichlobentiazox | 100 | 100 | 0 | 0 | 33 | 0 | * |
|  | Chitooligosaccharides + Probenazole | 100 | 100 | 0 | 0 | 27 | 0 | * |
| Test 4 (spray treatment) | Chitooligosaccharides + Isotianil | 100 | 100 | 0 | 10 | 43 | 10 | 4.3 |
|  | Chitooligosaccharides + Tiadinil | 100 | 100 | 0 | 0 | 33 | 0 | * |
|  | Chitooligosaccharides + Beta-aminobutyric acid | 100 | 300 | 0 | 20 | 73 | 20 | 3.65 |

* observed control value (OV) with the composition A + B is greater than Colby expected control value (CEV), but F cannot be mathematically calculated Combinations with Laminarin (Spray Treatment):

| Compound A + B | Conc. A (ppm) | Conc. B (ppm) | Percentage of disease control | | | | Synergy Factor (F) |
|---|---|---|---|---|---|---|---|
|  |  |  | OV | | | CEV | |
|  |  |  | A | B | A + B | (A + B) | |
| Laminarin + Sodium saccharin | 30 | 300 | 71 | 95 | 100 | 99 | 1.01 |
| Laminarin + Sodium saccharin | 100 | 300 | 76 | 95 | 100 | 99 | 1.01 |

Combinations with Carrageenan (Spray Treatment):

| Compound A + B | Conc. A (ppm) | Conc. B (ppm) | Percentage of disease control | | | | Synergy Factor (F) |
|---|---|---|---|---|---|---|---|
|  |  |  | OV | | | CEV | |
|  |  |  | A | B | A + B | (A + B) | |
| Carrageenan + Sodium saccharin | 100 | 300 | 75 | 95 | 100 | 99 | 1.01 |
| Carrageenan + Sodium saccharin | 3000 | 300 | 61 | 95 | 100 | 98 | 1.02 |

2. *Pseudomonas syringae* pv. *Lachrymans* on Cucumber
Disease: Bacterial spot on cucumber
Methodology:

1.2-leaf stage cucumber plants (cv. Suzunari-suyo), grown in pots under controlled conditions, were treated by spraying of the leaves with the mixture in question, dispersed in an aqueous solution. After 2 days, plants were inoculated and infected with an aqueous suspension of *Pseudomonas syringae* pv. *Lachrymans* ($1\times10^8$ cfu/ml), and they were kept in a growth chamber at 25° C. and 90% RH. 7 days after pathogen inoculation, infection levels were assessed and percentages of disease control and expected values were calculated according to Abbott's and Colby's formulas, respectively.

Results

| | Compound A + B | Conc. A (ppm) | Conc. B (ppm) | Percentage of disease control | | | | Synergy Factor (F) |
|---|---|---|---|---|---|---|---|---|
| | | | | OV | | | CEV | |
| | | | | A | B | A + B | (A + B) | |
| Test 1 | Chitooligosaccharides + Sodium saccharin | 100 | 300 | 14 | 36 | 79 | 45 | 1.76 |
| Test 2 | Chitooligosaccharides + Probenazole | 100 | 100 | 46 | 45 | 85 | 70 | 1.21 |
| Test 3 | Chitooligosaccharides + Probenazole | 100 | 100 | 63 | 45 | 87 | 80 | 1.09 |
| Test 4 | Chitooligosaccharides + Acibenzolar-S-methyl | 100 | 100 | 0 | 86 | 91 | 86 | 1.06 |

3. *Puccinia recondita* on Wheat
Disease: Brown rust on wheat
Methodology:

1.2-leaf stage wheat plants, grown in pots under controlled conditions, were treated by spraying of the leaves with the mixture in question, dispersed in an aqueous solution. After 4 days, plants were inoculated and infected with a spore suspension of *Puccinia recondite* ($1\times10^6$ uredospores/ml), and, 10 days after pathogen inoculation, infection levels were assessed and percentages of disease control and expected values were calculated according to Abbott's and Colby's formulas, respectively.

Results

| Compound A + B | Conc. A (ppm) | Conc. B (ppm) | Percentage of disease control | | | | Synergy Factor (F) |
|---|---|---|---|---|---|---|---|
| | | | OV | | | CEV | |
| | | | A | B | A + B | (A + B) | |
| Chitooligosaccharides + Sodium saccharin | 100 | 300 | 0 | 4 | 63 | 4 | 15.75 |

4. *Blumeria graminis* f. Sp. *Tritici* on Wheat
    Disease: Powdery mildew on wheat
Methodology:

1.2-leaf stage wheat plants, grown in pots under controlled conditions, were treated by spraying of the leaves with the mixture in question, dispersed in an aqueous solution. After 4 days, plants were inoculated sprinkled with *Blumeria graminis* f. sp. *Tritici*, and they were kept in a growth chamber at 20° C. and about 60% RH. 10 days after pathogen infection, infection levels were assessed and percentages of disease control and expected values were calculated according to Abbott's and Colby's formulas, respectively.

Results

| Compound A + B | Conc. A (ppm) | Conc. B (ppm) | Percentage of disease control | | | | Synergy Factor (F) |
|---|---|---|---|---|---|---|---|
| | | | OV | | | CEV | |
| | | | A | B | A + B | (A + B) | |
| Chitooligosaccharides + Sodium saccharin | 100 | 300 | 0 | 40 | 61 | 40 | 1.53 |

5. *Pyricularia oryzae* on Rice
    Disease: Rice blast
Methodology:

1.2-leaf stage rice plants, grown in pots under controlled conditions, were treated by soil drench with the mixture in question, dispersed in an aqueous solution. After 7 days, plants were inoculated and infected with a spore suspension of *Pyricularia oryzae* ($4 \times 10^5$ spores/ml), and, 14 days after pathogen inoculation, infection levels were assessed and percentages of disease control and expected values were calculated according to Abbott's and Colby's formulas, respectively.

Results

| | Compound A + B | Conc. A (ppm) | Conc. B (ppm) | Percentage of disease control | | | | Synergy Factor (F) |
|---|---|---|---|---|---|---|---|---|
| | | | | OV | | | CEV | |
| | | | | A | B | A + B | (A + B) | |
| Test 1 | Chitooligosaccharides + Sodium saccharin | 200 | 10 | 0 | 30 | 55 | 30 | 1.83 |
| | Chitooligosaccharides + Sodium saccharin | 200 | 20 | 0 | 45 | 57 | 45 | 1.27 |
| | Chitooligosaccharides + Sodium saccharin | 200 | 100 | 0 | 53 | 61 | 53 | 1.15 |
| | Chitooligosaccharides + Sodium saccharin | 200 | 200 | 0 | 40 | 45 | 40 | 1.13 |
| | Chitooligosaccharides + Sodium saccharin | 200 | 300 | 0 | 15 | 84 | 15 | 5.60 |
| | Chitooligosaccharides + Sodium saccharin | 300 | 20 | 2 | 45 | 58 | 46 | 1.26 |
| | Chitooligosaccharides + Sodium saccharin | 300 | 100 | 2 | 53 | 72 | 54 | 1.33 |
| | Chitooligosaccharides + Sodium saccharin | 300 | 300 | 2 | 15 | 75 | 17 | 4.41 |
| Test 2 | Chitooligosaccharides + Acibenzolar-S-methyl | 100 | 4 | 0 | 29 | 87 | 29 | 3 |
| | Chitooligosaccharides + Acibenzolar-S-methyl | 100 | 10 | 0 | 49 | 82 | 49 | 1.67 |
| | Chitooligosaccharides + Acibenzolar-S-methyl | 100 | 20 | 0 | 87 | 96 | 87 | 1.10 |
| | Chitooligosaccharides + Acibenzolar-S-methyl | 100 | 40 | 0 | 83 | 93 | 83 | 1.12 |

-continued

| Compound A + B | Conc. A (ppm) | Conc. B (ppm) | Percentage of disease control | | | Synergy Factor (F) |
|---|---|---|---|---|---|---|
| | | | A | B | OV A + B | CEV (A + B) |
| Chitooligosaccharides + Acibenzolar-S-methyl | 100 | 100 | 0 | 70 | 82 | 70 | 1.17 |
| Chitooligosaccharides + Acibenzolar-S-methyl | 200 | 4 | 0 | 29 | 82 | 29 | 2.83 |
| Chitooligosaccharides + Acibenzolar-S-methyl | 200 | 10 | 0 | 49 | 78 | 49 | 1.59 |
| Chitooligosaccharides + Acibenzolar-S-methyl | 200 | 20 | 0 | 87 | 100 | 87 | 1.15 |
| Chitooligosaccharides + Acibenzolar-S-methyl | 200 | 40 | 0 | 83 | 91 | 83 | 1.10 |
| Chitooligosaccharides + Acibenzolar-S-methyl | 300 | 4 | 0 | 29 | 61 | 29 | 2.10 |
| Chitooligosaccharides + Acibenzolar-S-methyl | 300 | 10 | 0 | 49 | 82 | 49 | 1.67 |
| Chitooligosaccharides + Acibenzolar-S-methyl | 300 | 40 | 0 | 83 | 86 | 83 | 1.04 |
| Chitooligosaccharides + Acibenzolar-S-methyl | 300 | 100 | 0 | 70 | 85 | 70 | 1.21 |
| Test 3 Chitooligosaccharides + Probenazole | 100 | 100 | 0 | 71 | 75 | 71 | 1.06 |
| Chitooligosaccharides + Isotianil | 100 | 100 | 0 | 77 | 79 | 77 | 1.03 |
| Chitooligosaccharides + Acibenzolar-S-methyl | 100 | 100 | 0 | 71 | 76 | 71 | 1.07 |
| Chitooligosaccharides + Beta-Aminobutyric acid | 100 | 300 | 0 | 0 | 61 | 0 | * |
| Laminarin + Acibenzolar-S-methyl | 100 | 100 | 47 | 71 | 86 | 84 | 1.02 |
| Laminarin + Beta-Aminobutyric acid | 100 | 300 | 47 | 0 | 76 | 47 | 1.62 |
| Carrageenan + Probenazole | 100 | 100 | 44 | 71 | 89 | 84 | 1.06 |
| Carrageenan + Isotianil | 100 | 100 | 44 | 77 | 91 | 87 | 1.05 |
| Carrageenan + Tiadinil | 100 | 100 | 44 | 80 | 92 | 89 | 1.03 |
| Carrageenan + Acibenzolar-S-methyl | 100 | 100 | 44 | 71 | 89 | 83 | 1.07 |
| Carrageenan + Beta-Aminobutyric acid | 100 | 300 | 44 | 0 | 46 | 44 | 1.05 |
| Test 4 Chitooligosaccharides + Probenazole | 100 | 100 | 19 | 71 | 88 | 77 | 1.14 |
| Chitooligosaccharides + Acibenzolar-S-methyl | 100 | 100 | 19 | 71 | 84 | 76 | 1.11 |

* observed control value (OV) with the composition A + B is greater than Colby expected control value (CEV), but F cannot be mathematically calculated 6. *Pseudomonas cannbina* pv. *alisalensis* on Chinese Cabbage Disease: Bacterial blight on Chinese cabbage Methodology:

3.5-leaf stage Chinese cabbage plants (cv. Muso), grown in pots under controlled conditions, were treated by spraying of the leaves with the mixture in question, dispersed in an aqueous solution. After 7 days, plants were inoculated and infected with a bacterial suspension of *Pseudomonas cannbina* pv. *alisalensis* ($1 \times 10^8$ cfu/ml), and they were kept in a growth chamber at 25° C. and 90% RH. 7 days after pathogen inoculation, infection levels were assessed and percentages of disease control and expected values were calculated according to Abbott's and Colby's formulas, respectively.

Results

Combinations with Chitooligosaccharides:

| | Compound A + B | Conc. A (ppm) | Conc. B (ppm) | Percentage of disease control | | | Synergy Factor (F) |
|---|---|---|---|---|---|---|---|
| | | | | A | B | OV A + B | CEV (A + B) |
| Test 1 | Chitooligosaccharides + Sodium saccharin | 100 | 300 | 0 | 57.1 | 58 | 57.1 | 1.02 |
| Test 2 | Chitooligosaccharides + Acibenzolar-S-methyl | 100 | 4 | 1 | 5 | 37 | 6 | 6.17 |
| | Chitooligosaccharides + | 100 | 10 | 1 | 18 | 100 | 19 | 5.26 |

-continued

| | Compound A + B | Conc. A (ppm) | Conc. B (ppm) | Percentage of disease control OV | | | CEV (A + B) | Synergy Factor (F) |
|---|---|---|---|---|---|---|---|---|
| | | | | A | B | A + B | | |
| | Chitooligosaccharides + Acibenzolar-S-methyl | 100 | 20 | 1 | 12 | 48 | 13 | 3.69 |
| | Chitooligosaccharides + Acibenzolar-S-methyl | 100 | 40 | 1 | 84 | 94 | 84 | 1.12 |
| | Chitooligosaccharides + Acibenzolar-S-methyl | 100 | 100 | 1 | 89 | 91 | 89 | 1.02 |
| | Chitooligosaccharides + Acibenzolar-S-methyl | 200 | 4 | 5 | 5 | 23 | 10 | 2.3 |
| | Chitooligosaccharides + Acibenzolar-S-methyl | 200 | 10 | 5 | 18 | 64 | 22 | 2.91 |
| | Chitooligosaccharides + Acibenzolar-S-methyl | 200 | 20 | 5 | 12 | 89 | 16 | 5.56 |
| Test 3 | Chitooligosaccharides + Acibenzolar-S-methyl | 100 | 10 | 11 | 35 | 85 | 42 | 2.02 |
| | Chitooligosaccharides + Acibenzolar-S-methyl | 100 | 20 | 11 | 17 | 98 | 26 | 3.77 |
| | Chitooligosaccharides + Acibenzolar-S-methyl | 200 | 10 | 14 | 35 | 85 | 44 | 1.93 |
| | Chitooligosaccharides + Acibenzolar-S-methyl | 200 | 20 | 14 | 17 | 96 | 29 | 3.31 |
| | Chitooligosaccharides + Acibenzolar-S-methyl | 200 | 40 | 14 | 95 | 100 | 96 | 1.04 |
| | Chitooligosaccharides + Acibenzolar-S-methyl | 300 | 10 | 5 | 35 | 87 | 38 | 2.29 |
| | Chitooligosaccharides + Acibenzolar-S-methyl | 300 | 20 | 5 | 17 | 96 | 21 | 4.57 |
| | Chitooligosaccharides + Acibenzolar-S-methyl | 300 | 40 | 5 | 95 | 100 | 95 | 1.05 |
| | Chitooligosaccharides + Acibenzolar-S-methyl | 300 | 100 | 5 | 98 | 100 | 98 | 1.02 |
| Test 4 | Chitooligosaccharides + Dichlobentiazox | 100 | 100 | 0 | 0 | 57 | 0 | * |
| | Chitooligosaccharides + 2,6-Dichloroisonicotinic acid | 100 | 300 | 0 | 83 | 93 | 83 | 1.12 |
| | Chitooligosaccharides + Beta-Aminobutyric acid | 100 | 300 | 0 | 46 | 66 | 46 | 1.43 |

* observed control value (OV) with the composition A + B is greater than Colby expected control value (CEV), but F cannot be mathematically calculated Combinations with Laminarin:

| | Compound A + B | Conc. A (ppm) | Conc. B (ppm) | Percentage of disease control OV | | | CEV (A + B) | Synergy Factor (F) |
|---|---|---|---|---|---|---|---|---|
| | | | | A | B | A + B | | |
| Test 1 | Laminarin + Probenazole | 100 | 100 | 25 | 25 | 62 | 44 | 1.41 |
| Test 2 | Laminarin + Dichlobentiazox | 100 | 100 | 11 | 0 | 41 | 11 | 3.73 |
| | Laminarin + 2,6-Dichloroisonicotinic acid | 100 | 300 | 11 | 83 | 98 | 85 | 1.15 |

Combinations with Carrageenan:

|  | Compound A + B | Conc. A (ppm) | Conc. B (ppm) | Percentage of disease control | | | | Synergy Factor (F) |
|---|---|---|---|---|---|---|---|---|
|  |  |  |  | OV | | | CEV | |
|  |  |  |  | A | B | A + B | (A + B) | |
| Test 1 | Carrageenan + Sodium saccharin | 100 | 300 | 0 | 75 | 79 | 75 | 1.05 |
|  | Carrageenan + Sodium saccharin | 3000 | 300 | 13 | 75 | 90 | 78 | 1.15 |
|  | Carrageenan + Probenazole | 100 | 100 | 0 | 25 | 56 | 25 | 2.24 |
|  | Carrageenan + Acibenzolar-S-methyl | 100 | 100 | 0 | 85 | 91 | 85 | 1.07 |
| Test 2 | Carrageenan + Dichlobentiazox | 100 | 100 | 13 | 0 | 24 | 13 | 1.85 |
|  | Carrageenan + 2,6-Dichloroisonicotinic acid | 100 | 300 | 13 | 83 | 93 | 85 | 1.09 |

7. *Colletotrichum orbiculare* on Cucumber
   Disease: Anthracnose on cucumber
Methodology:
1.2-leaf stage cucumber plants (cv. Suzunari-suyo), grown in pots under controlled conditions, were treated by spraying of the leaves with the mixture in question, dispersed in an aqueous solution. After 7 days, plants were inoculated and infected with a spore suspension of *Colletotrichum orbiculare* ($1 \times 10^4$ spores/ml), and they were kept in a growth chamber at 25° C. and 90% RH. 7 days after pathogen inoculation, infection levels were assessed and percentages of disease control and expected values were calculated according to Abbott's and Colby's formulas, respectively.

Results

| Compound A + B | Conc. A (ppm) | Conc. B (ppm) | Percentage of disease control | | | | Synergy Factor (F) |
|---|---|---|---|---|---|---|---|
|  |  |  | OV | | | CEV | |
|  |  |  | A | B | A + B | (A + B) | |
| Chitooligosaccharides + Acibenzolar-S-methyl | 100 | 100 | 8 | 92 | 100 | 92 | 1.09 |

8. *Phakopsora pachyrhizi* on Soybean
   Disease: Asian rust on soybean
Methodology:
1.5-leaf stage soybean plants (cv. Tsurunoko-daizu), grown in pots under controlled conditions, were treated by spraying of the leaves with the mixture in question, dispersed in an aqueous solution. After 7 days, plants were inoculated and infected with a spore suspension of *Phakopsora pachyrhizi* ($1 \times 10^6$ uredospores/ml), and they were kept in a growth chamber at 25° C. and 90% RH. 10 days after pathogen inoculation, infection levels were assessed and percentages of disease control and expected values were calculated according to Abbott's and Colby's formulas, respectively.

Results

Combinations with Chitooligosaccharides:

| Compound A + B | Conc. A (ppm) | Conc. B (ppm) | Percentage of disease control | | | | Synergy Factor (F) |
|---|---|---|---|---|---|---|---|
|  |  |  | OV | | | CEV | |
|  |  |  | A | B | A + B | (A + B) | |
| Chitooligosaccharides + Probenazole | 100 | 100 | 7 | 7 | 73 | 13 | 5.62 |
| Chitooligosaccharides + Dichlobentiazox | 100 | 100 | 7 | 53 | 60 | 56 | 1.07 |

-continued

| Compound A + B | Conc. A (ppm) | Conc. B (ppm) | Percentage of disease control | | | | Synergy Factor (F) |
|---|---|---|---|---|---|---|---|
| | | | OV | | | CEV | |
| | | | A | B | A + B | (A + B) | |
| Chitooligosaccharides + Isotianil | 100 | 100 | 7 | 20 | 40 | 26 | 1.54 |
| Chitooligosaccharides + Beta-Aminobutyric acid | 100 | 100 | 7 | 0 | 40 | 7 | 5.71 |

Combinations with Laminarin:

| Compound A + B | Conc. A (ppm) | Conc. B (ppm) | Percentage of disease control | | | | Synergy Factor (F) |
|---|---|---|---|---|---|---|---|
| | | | OV | | | CEV | |
| | | | A | B | A + B | (A + B) | |
| Laminarin + Probenazole | 100 | 100 | 0 | 7 | 33 | 7 | 4.71 |
| Laminarin + Isotianil | 100 | 100 | 0 | 20 | 60 | 20 | 3 |

Combinations with Carrageenan:

| Compound A + B | Conc. A (ppm) | Conc. B (ppm) | Percentage of disease control | | | | Synergy Factor (F) |
|---|---|---|---|---|---|---|---|
| | | | OV | | | CEV | |
| | | | A | B | A + B | (A + B) | |
| Carrageenan + Isotianil | 100 | 100 | 20 | 20 | 47 | 36 | 1.31 |

The invention claimed is:

1. An aqueous composition comprising a mixture of a pattern-triggered immunity inductor and a systemic resistance inductor, the mixture being plant resistance enhancing and producing an enhanced efficacy or disease control value compared to the pattern-triggered inductor solely and the systemic resistance inductor solely, wherein:

the pattern-triggered immunity inductor is chitooligosaccharides; and the systemic resistance inductor is sodium saccharin; and wherein an amount in said mixture of the chitooligosaccharides is between 100 to 300 ppm and an amount in said mixture of the sodium saccharine is between 10 to 300 ppm and the balance of said mixture is water.

2. The aqueous composition according to claim 1 wherein the weight ratio between the pattern-triggered immunity inductor and the systemic resistance inductor is from 200:1 to 1:6000.

3. The aqueous composition according to claim 1 wherein the concentration by weight of the pattern-triggered immunity inductor and the systemic resistance inductor is from 1 ppm to 95% in weight.

4. The aqueous composition according to claim 1 wherein the weight ratio between the pattern-triggered immunity inductor chitooligosaccharides and the systemic resistance inductor sodium saccharine is from 10:1 to 1:10.

5. The aqueous composition according to claim 4 wherein the weight ratio between the chitooligosaccharides and the sodium saccharine is from 5:1 to 1:5.

6. The aqueous composition according to claim 5 wherein the weight ratio between the chitooligosaccharides and the sodium saccharine is from 1:1 to 1:5.

7. A kit for providing an agricultural composition comprising the aqueous composition as defined in claim 1, the agricultural composition being plant resistance enhancing.

8. Method of producing the aqueous composition as defined in claim 1 comprising mixing the pattern-triggered immunity inductor with the systemic resistance inductor.

* * * * *